(12) United States Patent
Chromych

(10) Patent No.: US 11,041,692 B1
(45) Date of Patent: Jun. 22, 2021

(54) SYSTEM AND METHOD FOR LAUNCHING AND ACCELERATION OF OBJECTS

(71) Applicant: Michael Chromych, Akko (IL)

(72) Inventor: Michael Chromych, Akko (IL)

( * ) Notice: Subject to any disclaimer, the term of this patent is extended or adjusted under 35 U.S.C. 154(b) by 0 days.

(21) Appl. No.: 16/872,460

(22) Filed: May 12, 2020

(51) Int. Cl.
*F41F 3/04* (2006.01)
*B64G 1/00* (2006.01)

(52) U.S. Cl.
CPC ............ *F41F 3/0413* (2013.01); *B64G 1/002* (2013.01)

(58) Field of Classification Search
CPC . F41F 3/0412; F41F 3/073; F41F 1/00; B64G 1/002; F42B 14/06; F42B 14/061; F42B 14/064; F42B 14/065; F42B 14/067; F42B 14/068; F42B 14/08
USPC ........................................................ 89/1.818
See application file for complete search history.

(56) References Cited

U.S. PATENT DOCUMENTS

| | | | | |
|---|---|---|---|---|
| 3,011,404 A | * | 12/1961 | Russell ..................... | F42B 5/10 89/1.1 |
| 3,088,377 A | * | 5/1963 | Siegel ....................... | F41F 3/07 89/1.81 |
| 3,131,597 A | | 5/1964 | Gram et al. | |
| 3,253,511 A | * | 5/1966 | Zwicky ..................... | F41F 3/00 89/1.814 |
| 3,279,319 A | * | 10/1966 | Semonian .................. | F41F 3/07 89/1.81 |
| 3,431,815 A | * | 3/1969 | Kaufmann, Jr. ......... | F42B 14/08 89/1.1 |
| 3,837,107 A | * | 9/1974 | Swaim ..................... | F42B 5/045 42/105 |
| 4,073,213 A | * | 2/1978 | Stauff ...................... | F42B 5/105 89/1.701 |
| 4,157,054 A | * | 6/1979 | Cobb ........................ | F41F 1/00 89/1.7 |
| 4,854,260 A | * | 8/1989 | Woidich .................... | B63G 3/02 114/316 |
| 5,012,718 A | * | 5/1991 | Miller ....................... | F41A 1/00 89/1.816 |
| 5,194,688 A | * | 3/1993 | Piesik ..................... | F41F 3/0413 89/1.8 |
| 5,322,002 A | * | 6/1994 | Miskelly, Jr. ............. | F41A 1/02 89/1.7 |
| 6,079,310 A | * | 6/2000 | Yagla ..................... | F41F 3/0413 89/1.816 |
| 7,040,212 B1 | * | 5/2006 | Gaywood ............. | F41F 3/0413 89/1.801 |

(Continued)

*Primary Examiner* — Joshua E Freeman
(74) *Attorney, Agent, or Firm* — Ted Whitlock

(57) ABSTRACT

A system and method for acceleration of a flying object, preferably with large take-off mass is described. The system can accelerate an object with a mass of several hundred thousand tons. The system includes the use for object acceleration of free (for the period of direct acceleration) energy of exhaust gases of the system elements' jet engines, pushing-out force of water, force of Earth's gravity, initial movement energy of the compressed spring and vacuum, lifting force of light gases, as well as energy consuming, for the period of acceleration, action of the system elements' jet engines, gunpowder gases and drives. The system and the method include acceleration of an object simultaneously in several systems accelerating one inside the other with the summation and increase of acceleration speed.

The main elements of the system: launch barrel, carrier and booster pistons with jet engines, and pushing the pistons support.

16 Claims, 9 Drawing Sheets

(56) References Cited

U.S. PATENT DOCUMENTS

| | | | | |
|---|---|---|---|---|
| 7,207,254 | B2* | 4/2007 | Veitch | F41F 3/04 89/1.807 |
| 7,254,914 | B2* | 8/2007 | Lund | F41A 1/04 124/70 |
| 7,464,634 | B1* | 12/2008 | Shah | F41B 7/00 89/1.1 |
| 7,484,449 | B2* | 2/2009 | Shim | F41F 3/00 89/1.815 |
| 8,353,239 | B1* | 1/2013 | Patel | F41F 3/048 89/1.819 |
| 8,536,502 | B2* | 9/2013 | Hunter | B64G 1/002 244/3.23 |
| 9,567,107 | B2* | 2/2017 | Cartland | F41F 1/00 |
| 10,502,515 | B2* | 12/2019 | Sowers | F41F 1/06 |
| 10,577,129 | B1* | 3/2020 | Poulsen | F42B 10/46 |
| 2003/0000371 | A1* | 1/2003 | Ciappi | F41F 3/0413 89/1.817 |
| 2006/0011055 | A1* | 1/2006 | Root, Jr. | F41B 6/003 89/1.819 |
| 2006/0107828 | A1* | 5/2006 | Veitch | F41F 3/073 89/1.809 |
| 2010/0252676 | A1* | 10/2010 | Koessler | F41F 3/0413 244/63 |
| 2011/0315817 | A1* | 12/2011 | Miralles | B64F 1/06 244/63 |
| 2012/0152090 | A1* | 6/2012 | Skurdal | F41F 3/073 89/1.8 |
| 2015/0048212 | A1* | 2/2015 | Fricker | B64C 23/06 244/158.1 |
| 2015/0267996 | A1* | 9/2015 | Su | F41F 3/052 89/1.816 |
| 2018/0251237 | A1* | 9/2018 | Palmer | B64F 1/04 |
| 2018/0362191 | A1* | 12/2018 | Russell | B64G 1/002 |
| 2019/0107346 | A1* | 4/2019 | Bulman | F42B 14/08 |
| 2020/0031500 | A1* | 1/2020 | Russell | F41F 3/052 |
| 2020/0262590 | A1* | 8/2020 | Gentry | B64G 1/26 |

* cited by examiner

SYSTEM AND METHOD FOR LAUNCHING AND ACCELERATION OF OBJECTS

FIELD AND BACKGROUND OF THE INVENTION

The invention relates to launching and acceleration of objects, preferably having a large take-off weight (lifting, accelerating mass, a load of 640,000—six hundred forty thousand tons and even more (which is about 220 times more than the starting mass of the heaviest Saturn V rocket), the acceleration rate of several hundreds to several thousand meters per second, which is confirmed by the calculations, is carried out with the help of (through) reusable system, for the purposes of, for example, productive, efficient flight to Mars, reconnaissance and exploration of deep space, launching space factories and Noah's Ark, transfer of goods from one region of the Earth to the other.

The existing methods of launching heavy rockets into space do not provide the huge lifting capacity, which is necessary for the actual exploration of space. For launching a payload of, for example, 75,000 tons, a 60 kilometers high rocket will be required, which is not feasible. (For comparison, the Saturn V, USA Verner von Braun rocket is 110.6 meters high, the launch mass of the rocket is 2,913 tons, the payload mass is 139 tons, the ratio 21:1(2,913:139=21:1) is the best yet unsurpassed ratio.

There is a known project for flight to Mars (Space X, Elon Musk) BFR (Big Falcon Rocket, 2019) which also will not solve the problems.

The developed stationary reusable systems (up to 5 kilometers long) for the initial acceleration of objects (small rockets and carriers) also will not ensure the launch of a huge payload. (see: Electromagnetic Acceleration, railgun—eLaunch Hypersonic Launch Vehicles—EHLV project; Maglev, USA; Electrodynamic Acceleration project, Russia, see the Appendix, attachment 1 provided for visual effect only and can be excluded, image).

These systems can be considered analogs only due to the fact that they have a multi-kilometer case, a tube for accelerating a rocket in a completely different manner than the one according to the proposed new method. The Russian system is also interesting because the initial part of the acceleration is carried out with a slight downward slope to compensate for the energy costs of overcoming the gravitation during the subsequent acceleration upwards. In the new method (in one of the options), the amplified fall down is used instead of an inclination.

Them are known projects for launching small objects operating on the principle of "Slingatron" (helix diameter is approximately 2 kilometers), companies: Launch Point, Hyper V Technologies Corp., USA; projects of initial acceleration and launch of small rockets from large aircraft: Stratolaunch Systems project, USA, Elon Musk; MAKS project, Russia; Swiss Space Systems Project; Jerald Bull studied long-range space shots for the HARP (High Altitude Research Project, Canada, USA)—shots to the height of approximately 100 km, "Babylon" project—shots to the range of over 1,000 km.

Closest to the proposed invention in terms of using a long barrel, compressed rocket pushing-out gases and a support element for fixing the rocket in the barrel and preventing the gases from bursting out is "Method of and Apparatus for Launching Missiles (Rockets)", U.S. Pat. No. 3,131,597, class 244/63, the 5$^{th}$ of May 1964, A J Gram et al.

The prototype is slightly outdated, but there is nothing closer in terms of the main features (acceleration of a rocket in a long barrel on a support element using compressed gases).

According to this method, the rocket-projectile on the support frame is accelerated in a three-kilometer vertical barrel of 7 m. in diameter, located inside a mountain, by hydrogen compressed to 320 atmospheres and heated to 1700° C. To reduce the resistance to the acceleration, air is pumped out of the barrel, and the barrel is sealed with a diaphragm that is pierced by the rocket when it departs from the barrel, the support is opened and dropped after the departure, and then additional accelerating rocket boosters are activated. The launching rocket mass is 120 tons, the rocket velocity at the departure from the barrel is 2.5 km/s, acceleration time—2.5 s, acceleration—100 g.

This method has many disadvantages: such acceleration is unacceptable for humans, bad for electronics and engines; piercing the diaphragms at a speed of 25 km/s will damage the head of the rocket; poor internal ballistics; inability to regulate and control the acceleration; a huge plant for the production of hydrogen and superheated steam is required; the launch will cause large ecological cataclysm.

The payload capacity allowed by the method (120 tons) is insufficient for heavy space exploration tasks (and this is the main goal of my project).

Therefore, all these methods do not allow sufficient payload capacity, require large expenditure of energy for the acceleration, have no possibility of regulating and using various combinations of the acceleration.

Conclusion: it is necessary to find acceptable, energy efficient, inexpensive and controllable methods for launching a truly huge payload into space, which will be offered.

BRIEF SUMMARY OF THE INVENTION

According to the invention, the object is accelerated in a long barrel on a carrier piston having reaction engine for acceleration.

The exhaust gases from the engines of the carrier piston are accumulated in a limited closed volume under the carrier piston and are additionally compressed there by the booster piston advancing behind the carrier piston by means of a pushing support with the drive and reaction engine.

In this case, the exhaust gases from the reaction engines of the booster piston and the support also accumulate in a limited volume under them.

A large area of pistons (receiving the pressure of gases and much greater than the cross-sectional area of the object, for example, a rocket in the section of its nozzles) allows to convert low pressure of gases into a huge lifting force, contributing to their more intensive rapid progress with a much larger mass of the object. Due to the lifting force of compressed gases, the carrier piston with the object become, as it were, "weightless", which allows the reaction engines of the carrier piston to accelerate the carrying piston with the object much faster without the high energy consumption of engines for overcoming the Earth's gravity.

The calculation shows that the gas pressure of just 10 atmospheres (10 kg/cm$^2$) under the carrier piston creates a lift force exceeding the thrust of reaction engines in relation to the entire piston section. Similarly, it will be easier to accelerate the booster piston with the with a pushing support.

In order to move the pistons and the support, gases from the gunpowder charges and increasing energy applied in the volumes under the pistons and the support as they move in the barrel.

For increasing the acceleration rate, simultaneously with the acceleration of the object in the barrel, the barrel is accelerated (in the direction of the object acceleration) and the object is detached from the carrier piston in the form of a mortar launch at the end of the acceleration in the barrel, which provides the total departure velocity of the object.

For increasing the payload capacity of the launch and acceleration of the barrel and the object, the pushing force of water is used, for which the barrel is immersed in the water (sea) prior to the launch and it is pushed out of water during the launch, while the barrel is telescopic with an accelerated extension of the inner section in which the carrier piston is accelerated simultaneously with the object.

It is possible to use the Earth's gravity for acceleration, for which the carrier piston with the object is dropped into forced fall down in the barrel directed downward in the beginning with a further smooth transition of the bend of the barrel upwards.

In order to facilitate the movement and the motion of the carrier piston, vacuum is created in the launch barrel above the carrier piston for the entire acceleration period and the released energy of the pre-compressed spring is used to facilitate the movement of the elements of the accelerating system into motion from static position.

In order to facilitate the movement and the braking of the accelerating system elements and to increase the safety of the launch, it is planned to fill the volumes of the barrel above the carrier piston, below the pistons, the pushing support and free volumes of the pistons with a light lifting inert gas, for example, helium.

After reaching the top of the barrel, the object, detached from the carrier piston, flies out of the barrel and, if necessary, activates its engines for further acceleration, and the elements of the reusable launching system are braked and returned to their initial position.

The use of a protective cocoon around the object during its movement inside the barrel for departure after the detachment from the carrier piston is also planned.

Adjustment by the mode and loading capacity of launch and various combinations of use of elements of the accelerating system is possible.

In the present invention, the use of exhaust gases, the pushing-out force of water, the Earth's gravity, moving vacuum, light lifting gas and the release of energy of a compressed spring are huge sources of free energy for acceleration during the period of actual acceleration of the object in the launch barrel or with the aid of the barrel.

(This information is provided only for explaining the differences and novelties: unlike in the proposed one, in the prototype the diameter of the barrel and the support frame are commensurate with the diameter of the rocket, so for its advancement and acceleration in the barrel, enormous pressure is required, as in a conventional shot. The support frame does not have reaction engines and therefore exhaust gases and other sources are not used. In the prototype, vacuum is created in the barrel above the rocket just before the launch in order to reduce the resistance to movement forward, not for the entire period of acceleration and not for facilitating the movement due to the vacuum action which creates moving pressure drop above and under the piston, as in the new proposal. Filling the barrel with helium in the known methods—Russian electrodynamic acceleration, projectile acceleration in the tube at the Kolloman US Air Force base, New Mexico in 2003 was carried out for reducing aerodynamic resistance/drag with helium flowing around the object accelerated by another method. In the new proposal, in the case without vacuum over the object, helium will be easier to displace by the carrier piston movement (and not by flowing around it), since it is 7.26 times lighter than air and will also reduce friction and barrel heating. There is no pierced diaphragm, there is a sealing gate or a diaphragm that opens without contact with the object when it departs from the launch barrel).

DETAILED DESCRIPTION OF PREFERRED EMBODIMENTS

The numbering of the elements in the variants (examples) of the launch systems is shown in the FIGS. 1-9 (Reference Signs List):

Numeral 1 denotes an object (in these examples it is a rocket) that is accelerated and launched using the launch and acceleration system. This object is not part of the launch system itself.

Numeral 2 denotes the carrier piston on which or in which the object to be accelerated is installed.

Numeral 3 denotes the launch barrel in which or by means of which the object is accelerated.

Figure 6:
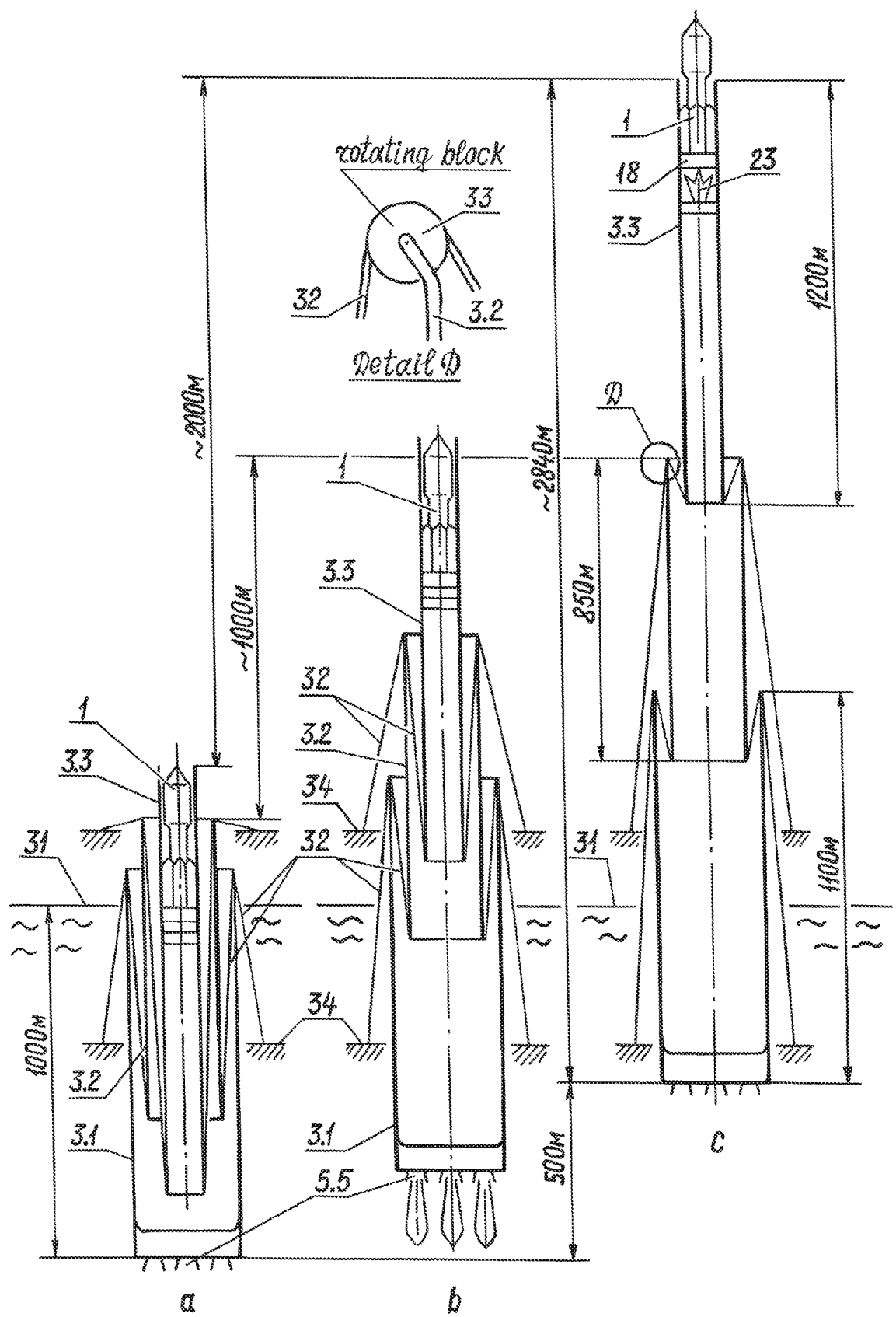
FIG. 6 shows a scheme of a rocket launch system only with the help of a telescopic barrel (without accelerating the rocket inside the barrel), which opens up with acceleration by means of polyspast connection of sections by the action of the pushing-out force of water, bottom reaction engines of the outer section of the barrel and with a final mortar detachment of the rocket.
Figure 7:
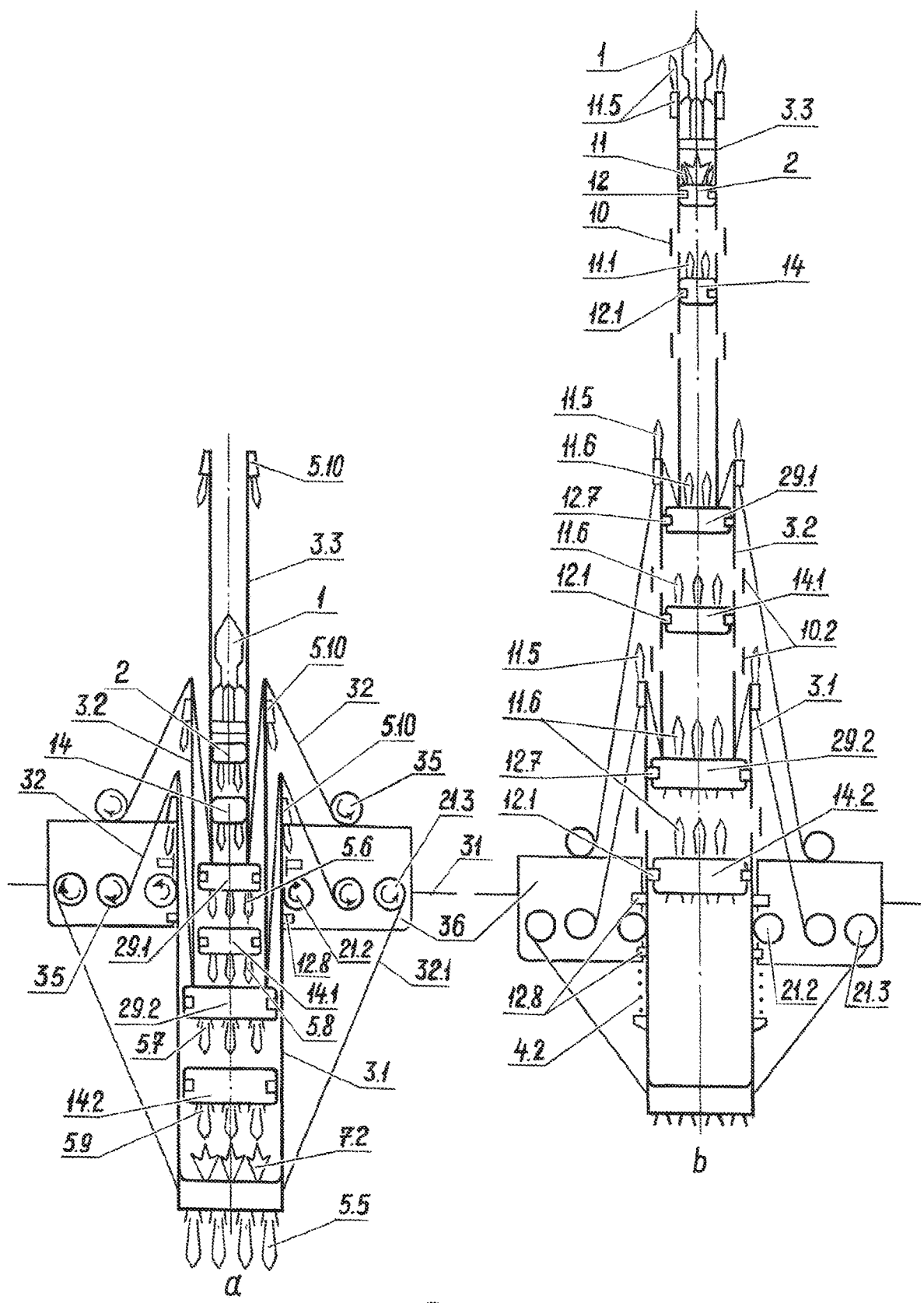
FIG. 7 shows a scheme of a rocket launch system as in FIG. 6, but already with simultaneous acceleration of the rocket on the carrier piston inside the telescopic barrel's inner section moving out with acceleration, using the principle of carrier and booster pistons, also to enhance the moving out of the inner sections of the launch barrel and using drives and external reaction engines to enhance and accelerate the moving out of the barrel sections in addition to the push-out force of water with the locating everything on a floating offshore platform.

Numeral 3.1, 3.2, 3.3 denote the sections of a telescopic launch barrel (FIGS. 6,7).

Numeral 4 denotes the dividing compression springs for moving and damping the pistons in the launch barrel.

Numeral 4.1 denotes the compression spring for moving and damping the accelerated launch barrel.

Numeral 4.2 denotes the braking spring for a shock-absorbing stop of the outer leading section of a telescopic launch barrel (FIG. 7).

Numeral 4.3 denotes the compression spring for pushing away the cocoon and for preventing collisions between the cocoon and the carrying piston (FIG. 9*c*.

Numeral 5 designates the reaction engines for acceleration of the carrier piston.

Numeral 5.1 denotes the reaction engines for acceleration of the booster piston.

Figure 3:
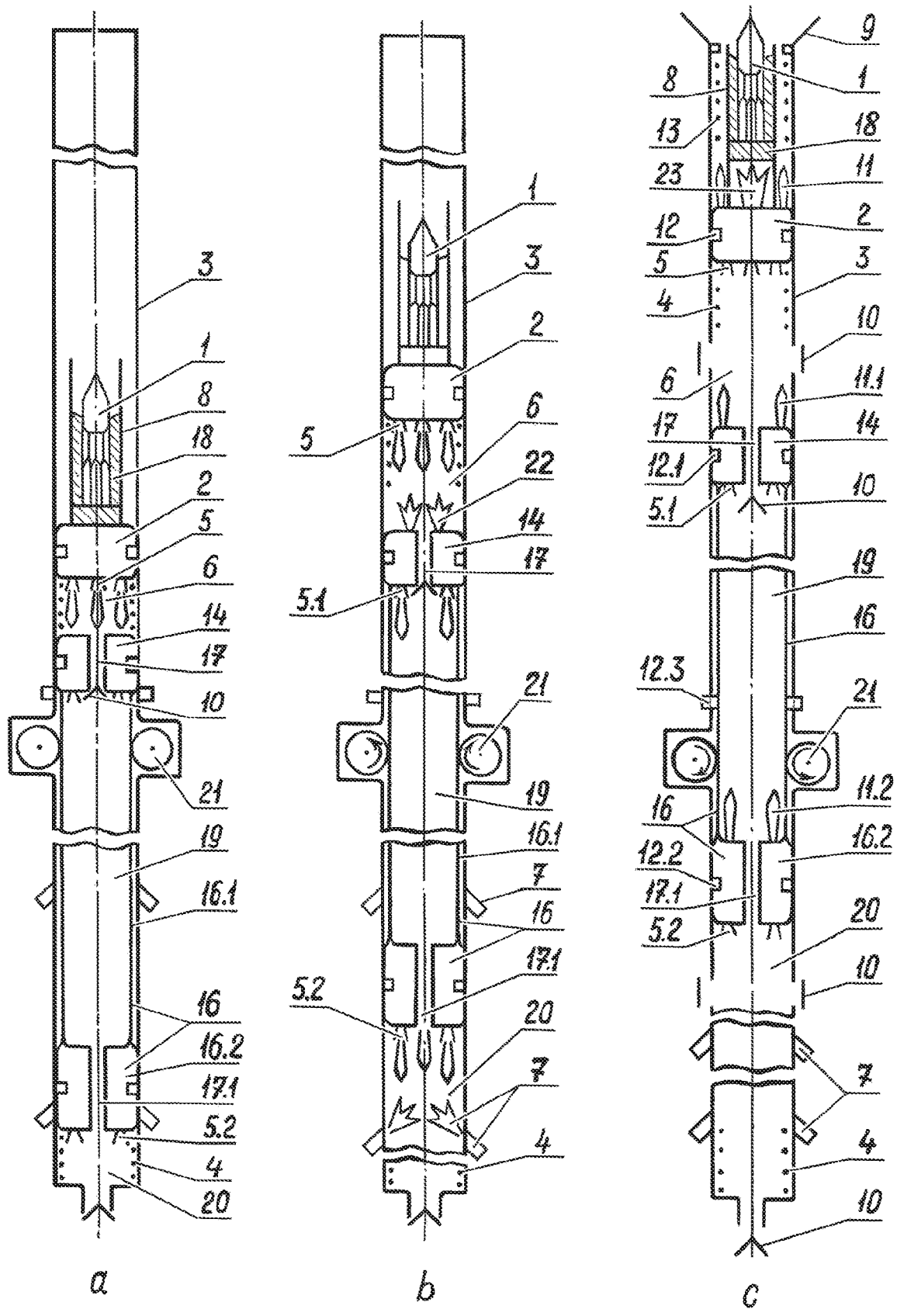
FIG. 3 shows a scheme of an object (rocket) launch system with elements as in FIG. 2, but supplemented with a pushing support with drives, which advances the booster piston and with a mortar detachment of the rocket at the end of acceleration in the barrel.

Numeral 5.2 denotes the reaction engines for acceleration of the pushing support piston and accordingly, acceleration of the support (FIG. 3).

Figure 5:
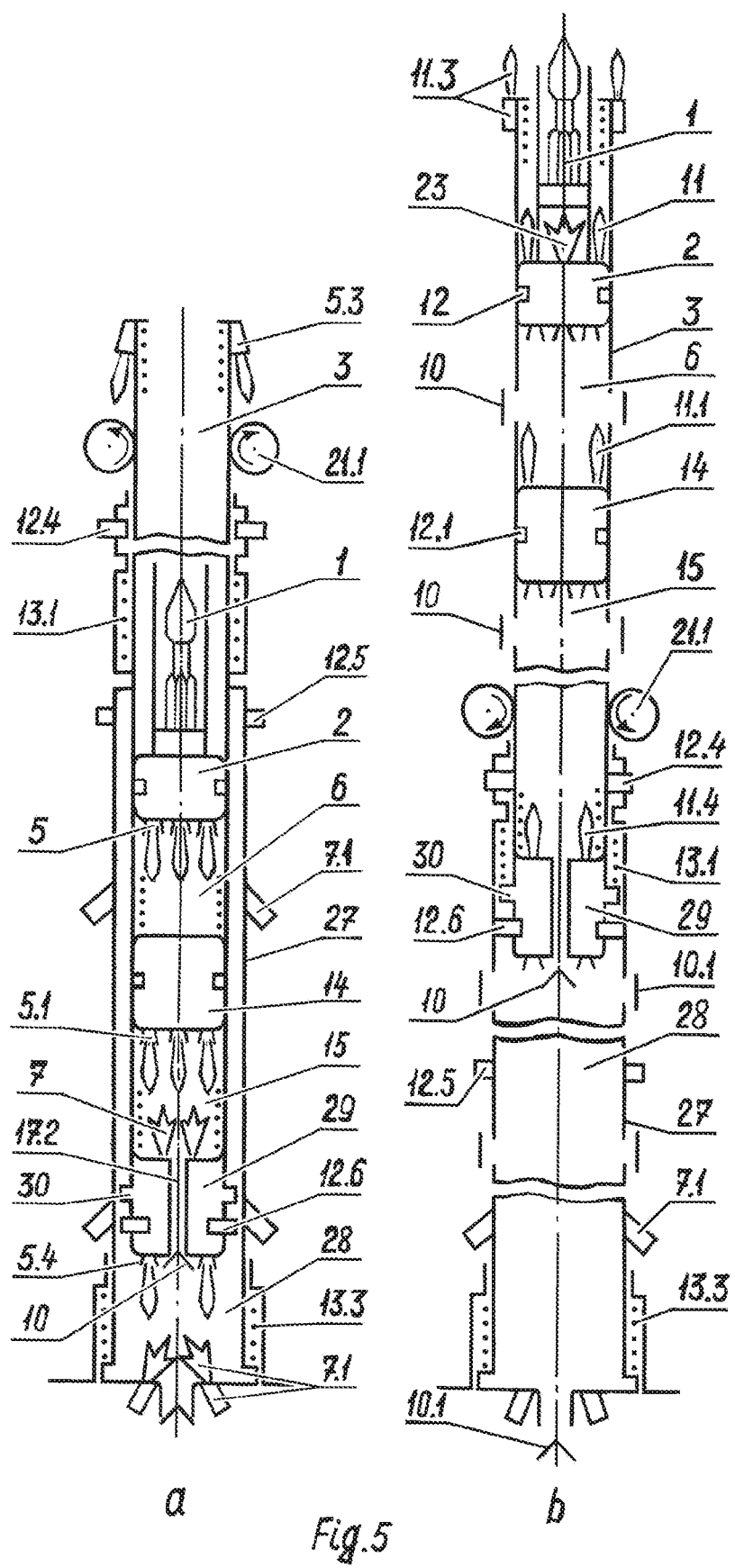
FIG. 5 shows a scheme of a rocket launch system in which, simultaneously with the acceleration of a rocket in the barrel and the final mortar detachment (detachment) of the rocket, the barrel itself is also accelerated from the cylinder. The pushing support is excluded from the scheme.

Numeral 5.3 denotes the external reaction engines for acceleration of the launch barrel (FIG. 5).

Numeral 5.4 denotes the reaction engines of the piston base of the accelerated launch barrel (FIG. 5).

Numeral 5.5 denotes the reaction engines of the base of the outer section of the telescopic launch barrel (FIGS. 6,7).

Numeral 5.6 denotes the reaction engines of the piston base of the inner section of the telescopic launch barrel (FIG. 7).

Numeral 5.7 denotes the reaction engines of the piston base of the middle section of the telescopic launch barrel (FIG. 7).

Numeral 5.8 denotes the reaction engines of the booster piston located under the piston base of the inner section of the telescopic launch barrel (FIG. 7).

Numeral 5.9 denotes the reaction engines of the booster piston located under the piston base of the middle section of the telescopic launch barrel (FIG. 7).

Numeral 5.10 denotes the reaction engines located in the upper parts of the telescopic launch barrel section for moving out and acceleration of the barrel sections (FIG. 7).

Numeral 5.11 denotes the reaction engines of the protective cocoon (FIG. 9*b*).

Numeral 6 denotes the closed volume under the carrier piston (FIG. 1-5).

Numeral 7 denotes the detonation of the gunpowder charges from the base and walls of the launch barrel (FIG. 1-5,7).

Numeral 7.1 denotes the detonation of gunpowder charges from the base and walls of the cylinder, in which the launch barrel is accelerated (FIG. 5).

Numeral 7.2 denotes the detonation of gunpowder charges from the base of the outer section of the telescopic launch barrel (FIG. 7).

Figure 1:
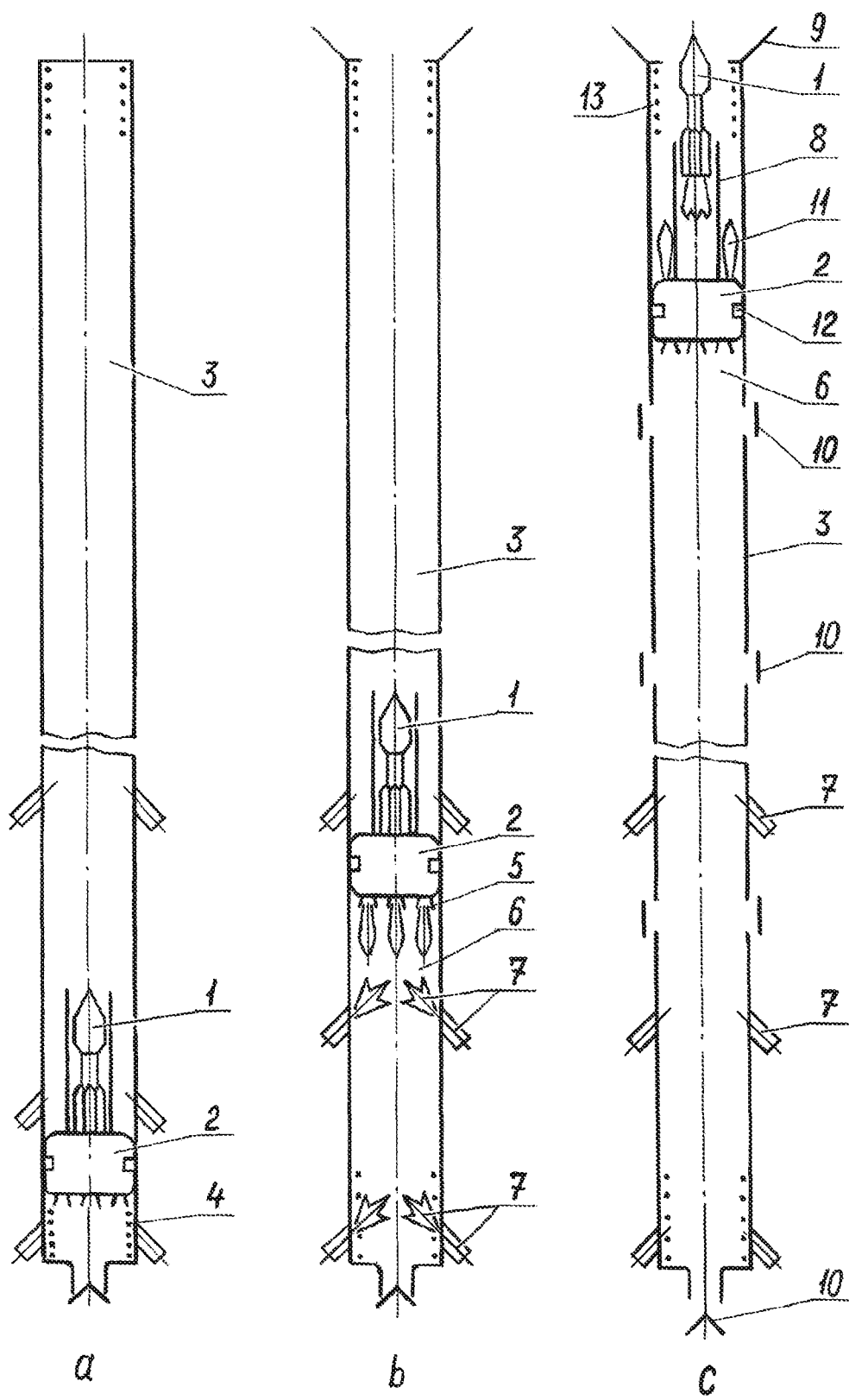
FIG. 1 shows a scheme of an object (rocket) launch system of on a carrier piston in a vertical or inclined stationary launch barrel using for acceleration reaction thrust engines of the carrier piston, exhaust gases and gas and energy-generating charges with regular detachment (from the container) of the rocket from the carrier piston at the end of its acceleration in the barrel.
Figure 2:
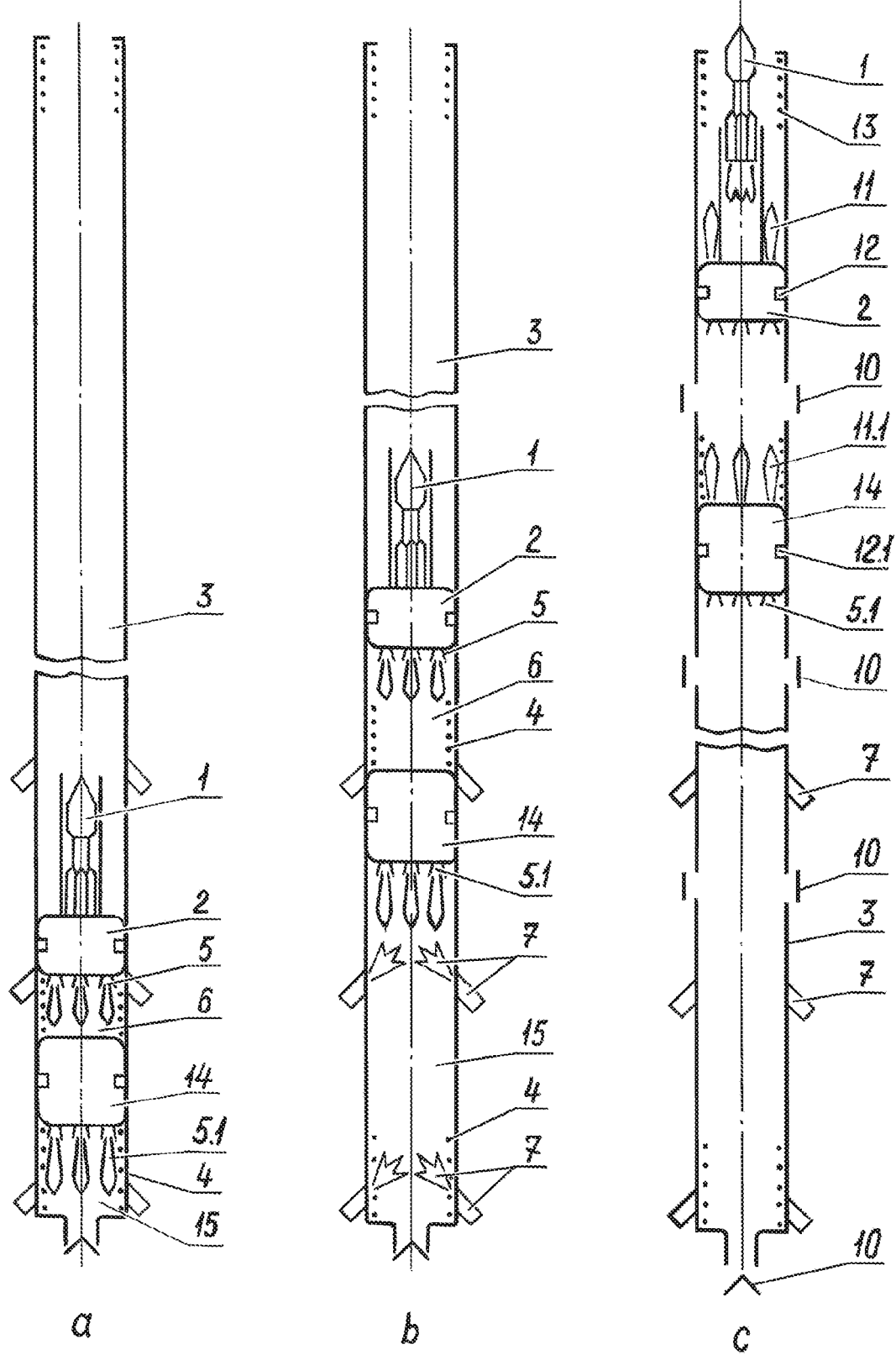
FIG. 2 shows a scheme of an object (rocket) launch system with elements as in FIG. 1, but supplemented with a booster piston.

Numeral 8 denotes the launching cylinder, the container or the mortar barrel from which an object departs at the end of its acceleration in the launch barrel (FIG. 1-3).

Numeral 9 denotes the opening of the sealing gate (FIGS. 1,3).

Numeral 10 denotes the pressure release valves for releasing the gas pressure from the launch barrel (FIG. 1-5, 7, 8).

Numeral 10.1 denotes the pressure release valves for releasing the gas from the cylinder in which the launch barrel is accelerated (FIG. 5).

Numeral 10.2 denotes the pressure release valves for releasing the gas from the volumes of the middle and outer sections of the telescopic launch barrel (FIG. 7).

Numeral 11 denotes the jet braking of the carrier piston (FIG. 1-3,5,8).

Figure 8:
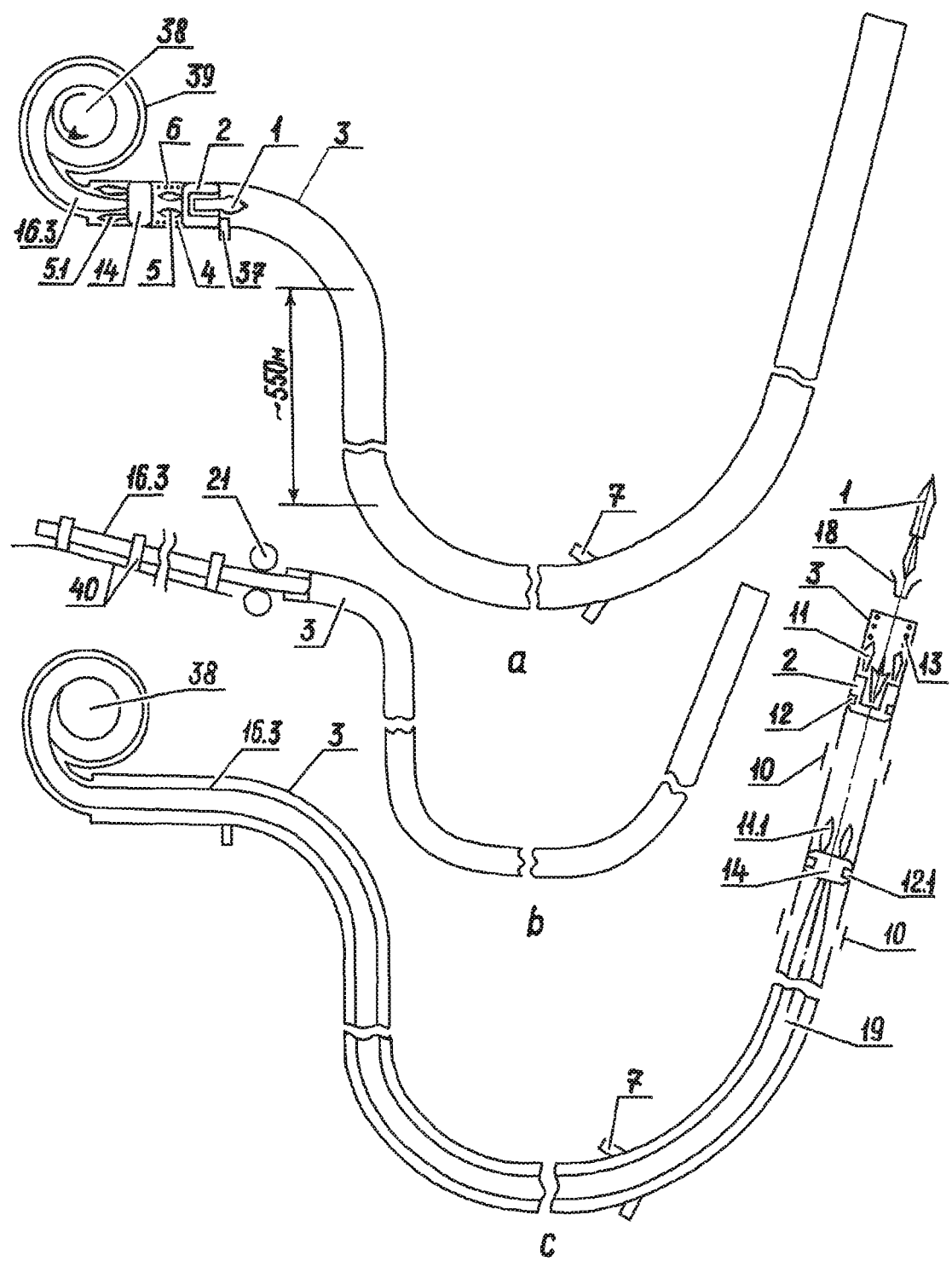
FIG. 8 shows a scheme of a rocket launch system in a curvilinear bent launch barrel using for acceleration the Earth's gravity, compressed gases and reaction engine thrust with a mortar detachment of the rocket from the carrier piston at the end of the acceleration in the barrel.

Numeral 11.1 denotes the jet braking of the booster piston (FIGS. 2,3,8.).

Numeral 11.2 denotes the jet braking of the piston base of the pushing support (FIG. 3).

Numeral 11.3 denotes the elements of jet braking of the launch barrel, located outside in its upper part (FIG. 5).

Numeral 11.4 denotes the elements of jet braking of the piston base of the launch barrel (FIG. 5).

Numeral 11.5 denotes the elements of jet braking of the sections of the telescopic launch barrel located in the upper outer part of the sections (FIG. 7).

Numeral 11.6 denotes the elements of jet braking of the pistons of the telescopic launch barrel (FIG. 7).

Numeral 11.7 denotes the jet braking of the cocoon (FIG. 9*c*).

Numeral 12 denotes the friction brake of the carrier piston (FIG. 1-3,5,7,8).

Numeral 12.1 denotes the friction brake of the booster piston. (FIGS. 2,3,7,8).

Numeral 12.2 denotes the friction brake of the piston base of the pushing support (FIG. 3).

Numeral 12.3 denotes the friction brake of the tubular part of the pushing support (FIG. 3).

Numeral 12.4 denotes the brake for stopping the launch barrel at the end of its acceleration in the cylinder (FIG. 5).

Numeral 12.5 denotes the emergency brake for braking of the launch barrel during its acceleration (FIG. 5).

Numeral 12.6 denotes the friction brake of the piston base of the launch barrel (FIG. 5).

Numeral 12.7 denotes the friction brakes of the piston bases of the telescopic barrel sections (FIG. 7).

Numeral 12.8 denotes the friction brake of the outer leading section of the telescopic launch barrel (FIG. 7).

The number 12.9 denotes the friction braking of the cocoon (FIG. 9*c*).

Numeral 13 denotes the braking spring inside the upper part of the launch barrel for braking the carrier piston (FIG. 1-5, 8).

Numeral 13.1 denotes the braking spring for braking the accelerated launch barrel at the end of its braking (FIG. 5).

Numeral 13.2 denotes the braking spring at the top of the barrel for braking the cup of the protective cocoon and other lower elements (FIGS. 9*b*, 9*c*).

Numeral 13.3 denotes the compression braking spring for counterforce damping use of the cylinder mass (27) for braking the launch barrel at the end of its acceleration (FIG. 5).

Numeral 14 denotes the booster piston (FIGS. 2,3,5,7,8).

Numeral 14.1 denotes the booster piston under the piston base of the inner section of the telescopic launch barrel (FIG. 7).

Numeral 14.2 denotes the booster piston under the piston base of the medium section of the telescopic launch barrel (FIG. 7).

The number 15 denotes the closed volume under the booster piston (FIG. 2).

Figure 4:
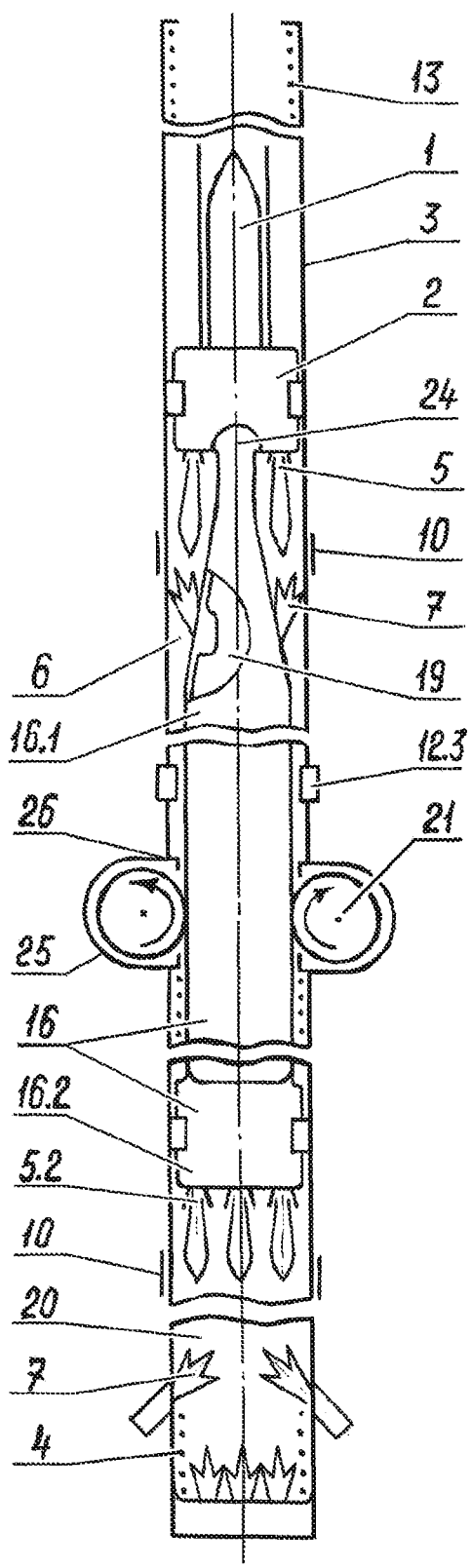
FIG. 4 shows a scheme of a rocket launch system in which the pushing support advances directly the carrier piston, while the booster piston is excluded from the scheme.

The number 16 denotes the pushing support, which enhances the movement of the booster piston and increases the speed of adjusting its progress and consists of 2 main parts indicated below (FIGS. 3,4).

Numeral 16.1 denotes the tubular hollow part of the pushing support.

Numeral 16.2 denotes the piston in the lower part of the pushing support.

Numeral 16.3 denotes the flexible pushing support (FIG. 8).

Numeral 17 denotes the axial channel in the booster piston for releasing the gas pressure from volume 6 during the braking (FIG. 3).

Numeral 17.1 denotes the nozzle channel in the lower pushing booster piston for the exit of the gas during the acceleration period (FIG. 3).

Numeral 17.2 denotes the axial channel in the piston base of the launch barrel for releasing the gas from the volume 15 during the braking period (FIG. 5).

Numeral 18 denotes the support frame on which or in which the rocket is installed for the occasion of its mortar detachment at the end of the acceleration (FIGS. 3,5,6,8).

Numeral 18.1 denotes the support frame of the protective cocoon (FIG. 9*b*).

Numeral 19 denotes the volume inside the hollow tubular part of the pushing support (FIGS. 3,4,8).

Numbering 20 denotes the volume under the piston of the pushing support (FIGS. 3,4).

Numeral 21 denotes the electromechanical (or any other suitable) drive (with adjustable speed, force and direction of the movement) of the pushing support (FIGS. 3,4).

Numeral 21.1 denotes the electromechanical drive (adjustable) for moving the launch barrel (FIG. 5).

Numeral 21.2 denotes the electromechanical drive (adjustable) for moving the outer section of the telescopic barrel (FIG. 7).

Numeral 21.3 denotes the cable electromechanical drive (adjustable) for moving the outer section of the telescopic barrel (FIG. 7).

Numeral 22 denotes the action of the amplifying pushing-out energy from the booster piston directed under the carrier piston (FIG. 3).

Numeral 23 denotes the action of the pushing out charge for the implementation of the mortar detachment of the rocket from the carrier piston (FIGS. 3,8), or from the top of the barrel section (FIG. 6).

Numeral 24 denotes the movable connection of the carrier piston with a pushing support to enable axial rotation of the piston (FIG. 4).

Numeral 25 denotes the joints (connections) between the parts of the whole (in the period of action) launch barrel (FIG. 4).

Numeral 26 denotes the sealing joint that provides the movement of the pushing support inside the launch barrel without gas bursting out (FIG. 4).

Numeral 27 denotes the cylinder in which the launch barrel is accelerated (FIG. 5).

Numeral 28 denotes the volume between the base of the cylinder and the bottom of the launch barrel (FIG. 5).

Numeral 29 denotes the piston base of the launch barrel (FIG. 5).

Numeral 29.1 denotes the piston base of the inner section 3.3 of the telescopic launch barrel (FIG. 7).

Numeral 29.2 denotes the piston base of the middle inner section 3.2 of the telescopic launch barrel (FIG. 7).

Numeral 30 denotes the stopper (prominence) for braking the launch barrel (FIG. 5).

Numeral 31 denotes the deep blue sea or the volume of water suitable for launch (FIGS. 6,7).

Numeral 32 denotes the cables of the polyspast connection of the telescopic launch barrel sections (FIGS. 6,7).

Numeral 32.1 denotes the drive cables of the outer section 3.1 of the telescopic launch barrel (FIG. 7).

Numeral 33 denotes the rotating blocks through which pass the cables of the polyspast connection of the sections (FIG. 6).

Numeral 34 denotes the bases on which the corresponding cable ends of the polyspast connection of sections are fixed (FIG. 6).

Numeral 35 denotes the drive drums for pull-up and winding of the cables of the polyspast system for extension the barrel sections (FIG. 7).

Numeral 36 denotes the floating platform on which the launch system for the sea launch is placed (FIG. 7).

Numeral 37 denotes the extendable stoppers that secure the carrier piston from a premature shift to a fall (FIG. 8).

Numeral 38 denotes the drive drum (with adjustable force, speed and direction of action) for moving the pushing support (FIG. 8).

Numeral 39 denotes the cassette, securing the coils of the support from bulging out (FIG. 8).

Numeral 40 denotes the inclined chute, securing the flexible pushing support as it moves (FIG. 8).

Figure 9:
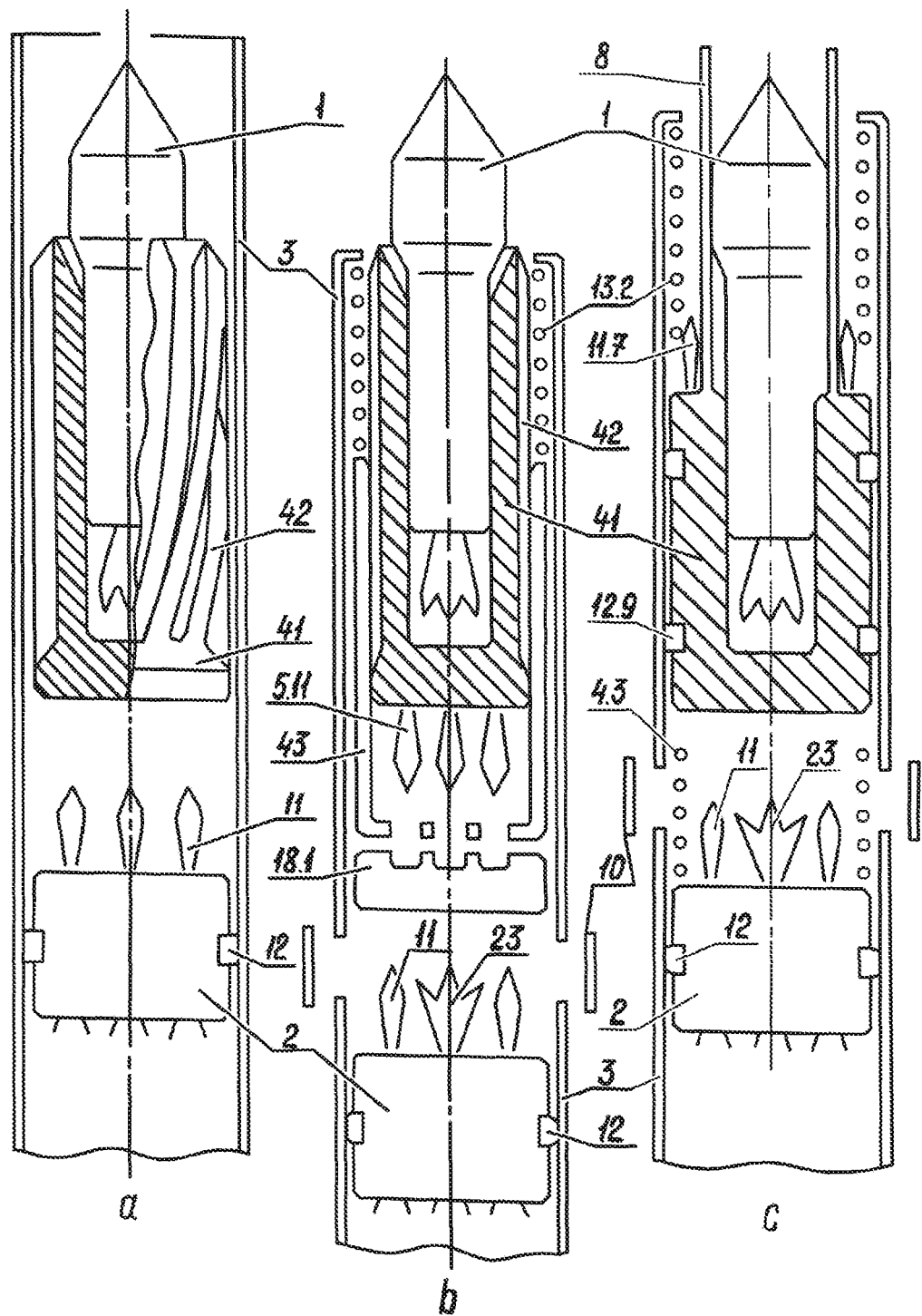
FIG. 9 shows schemes of options for detachment and departure of a rocket using a protective cocoon around the rocket.

Numeral 41 denotes the protective cocoon around a rocket (FIG. 9).

Numeral 42 denotes helical, spiral-shaped, inclined edges of the protective cocoon for providing it and therefore the rocket with rotation (FIG. 9*a*).

Numeral 43 denotes the cup in which a protective cocoon is located (FIG. 9*b*.).

The present invention is designed to launch into space or flight within the Earth boundaries of various objects with a huge payload or with an enormous mass implementing a reusable system to accelerate the object. After the object is accelerated by the system, the object is detached from the system to continue flying, and the system (its elements) are braked and returned to their original position. The system can be stationary, mobile, transportable, collapsible and floating (above water and under water).

Moreover, the system also provides for launching several objects in one package at a time during acceleration, which is divided into many objects after the departure from the system, or several objects or packages can be accelerated one after the other with the same or different functionality.

As one of the main elements of the system for accelerating an object, a long launch barrel is used. It can be stationary during the launch or moving in the direction of the acceleration of an object. The barrel in the presented options can be vertical, inclined, curved, telescopic, transparent. It may be located on the surface, in the sea, underground or under water. It is also possible to arrange a vertical or inclined replaceable launch barrel inside a fixing carrying support frame.

The launched object is accelerated in a long launch barrel on a carrier piston having powerful reaction engines, whose exhaust gases accumulate in a limited volume under the carrier piston. The cross sectional area of the carrier piston and of the launch barrel accordingly is much larger than the cross sectional area of an object, for example much larger than the cross sectional area of a super heavy rocket (as an object) in its nozzle zone (part).

A large carrier piston section that receives the pressure of accumulating exhaust gases converts this pressure into a huge lifting force, which, together with the reaction engine of the carrier piston, moves and accelerates the carrier piston with the object on it in the launch barrel.

The lifting force of the carrier piston equals to the pressure of gases beneath it multiplied by the cross-sectional area of the piston and, accordingly, the barrel. With a large area and low pressure, one can achieve a huge lifting force. The calculation shows that gas pressure of just 10 atmospheres (10 kg/cm$^2$) under the carrier piston creates a lift force exceeding the thrust of reaction engines located throughout the entire area of the carrier piston (with density of engine placing and their power like in a Saturn V rocket).

This will allow to increase by a factor of several times the mass of the object being launched and accelerated and to use effectively the enormous energy and quantity of the free exhaust gases in the further increasing dynamics, which during normal launch are useless, harmful, but beautifully fly into the atmosphere.

(For comparison with a conventional shot and prototype: During a shot, the pressure of expensive gases in the barrel reaches hundreds of atmospheres with a comparable (commensurable) diameter of the barrel and projectile and damped (decreasing) dynamics after reaching a peak during the acceleration in the barrel and a small projectile mass).

As the carrying piston moves on, the closed volume below it will increase and exhaust gases will disperse in this increasing volume, which reduces the acceleration efficiency. The speed and force of forward movement of the carrier piston is stabilized. Such a scheme is in principle feasible, but it will not provide intensifying and adjustable acceleration of the carrier piston.

The detonation (activation) of the gas-emitting gunpowder charges into the volume under the carrier piston will intensify acceleration, but in this case the pushing-out energy will still be dispersed along the entire length of the barrel behind the carrier piston and it will also be relatively difficult to change the force of its effect. Such a scheme is given in FIG. 1.

There is also an option when the carrier piston, in the process of acceleration of the object, flies out of the launch barrel with its subsequent safe landing on land or on water for reuse, which will reduce the length of the launch barrel by the braking distance of the carrier piston. In this case the object is detached from the carrier piston at the end of acceleration in the launch barrel or after departure from the barrel before the start of braking the carrier piston, so as not to lose speed.

In order to avoid dispersion of gases accumulating under the carrier piston along the length of the barrel, to concentrate them in a more effective area and smaller volume directly under the advancing carrier piston, to create the necessary gas pressure more quickly and to provide support and pressure of the gases, a booster piston is planned (added to the scheme) following the carrier piston at some distance and constantly presses the gases under it in a much smaller limited volume, which increases, intensifies and strengthens the acceleration of the carrier piston with an object.

Movement and acceleration of the said booster piston in the barrel is carried out with the help of its powerful reaction engines, while the exhaust gases from these engines will also accumulate in the volume behind the booster piston creating pressure that promotes its propulsion. The scheme with the booster piston is shown in FIG. 2. This scheme is also feasible in principle, but it will require high jet power and the use of additional gas-emitting charges to advance the booster piston and will not provide easy control of the compression force of gases under the carrier piston to enhance or reduce the speed and force of acceleration of the carrier piston with the object.

All pistons (carrier, booster, and the further mentioned ones) of the launch system having powerful launching reaction engines, can be made of materials and with elements reducing the impact of sound pressure, shaking, vibration etc. (from the operation of their engines) on the barrel, rocket (object) and other elements of the system (this is a secondary design issue).

To enhance the movement of the booster piston and increase the efficiency of the speed and force control of its advancement, a pushing support is provided to move the booster piston forward. Through the damping cushion of compressed gases between the carrier and the booster pistons, the impact on the booster piston will be transmitted respectively to the carrier piston, changing the parameters of its acceleration with the object.

The pushing support is advanced using an electromechanical drive or drives of powerful diesel engines (adjustable in speed, force and direction of action), reaction engines and gases under pressure of gas emitting charges and engine exhaust. This scheme with pushing support is shown in FIG. 3

As a result of all this, an effective system is formed: a bundle of carrier and booster pistons and a closed volume between them with exhaust gases accumulating in it, which moves along the launch barrel and accelerates the object with the ability to control and regulate the acceleration.

The huge lifting force of compressed exhaust gases accumulating under the carrier piston with an object on it will make them, as it were, "weightless" raised floating soaring while moving in the launch barrel during the main acceleration period, which will allow the reaction engines of the carrying piston to accelerate the carrier piston with the object in the launch barrel much faster, without large excessive spending of engine energy power to overcome the force Earth's gravity, which will turn from huge into "weightless".

The acceleration speed of an object with a gigantic mass, close to the velocity of discharge (ejection) of gases from the nozzles equals to 4.5-5 km/s (as in the usual first stage of heavy rockets) can be achieved in principle already at the end of the acceleration in the launch barrel of the estimated length and specified acceleration (see examples of calculations). For comparison, heavy rockets (Challenger, Shuttle, Saturn V) reached a speed of ~0.7 km/s at the altitude of ~8 km only, Falcon-9 speed ~1 km/s at an altitude of 32 km.

This "weightlessness" will also allow to use in the acceleration system engines with a much higher jet stream rate at a lower thrust, as it is done in space weightlessness. This will allow to accelerate the object in the barrel to an even greater speed, provided sufficient amount of supporting gases that are easy to create also without sufficient exhaust.

A high preliminary acceleration rate (using the proposed system) will eliminate the first and even second acceleration stages, which constitute the main mass of the conventional heavy-class rockets. For the already accelerated rocket in the launch barrel, much less fuel will be required for further acceleration of the payload. The ratio of the mass of the rocket to the payload for further acceleration—flight within the Earth—the Moon boundaries will be no higher than 6:1 (for the Saturn V rocket—21:1), and for the purpose of delivering cargo within the Earth boundaries from one region to another, the ratio will be almost 1:1, i.e. net payload weighing five hundred thousand tons (500,000) or more (e.g., TNT (Trinitrotoluene)) (140,000 tons for jet acceleration, maneuvering, active defense from means of destruction, acceleration in the direction of the target, total: 500,000+140,000=640,000 tons (see calculation and page 1 of the description).

To reduce the vertical dimensions of the accelerating launching system or the length of the launch barrel, the pushing support can be made flexible and wound before the launch on the external engine drum and during launch it will move with force into the launch barrel from the revolving engine drum with an adjustable speed.

Also, for this purpose, there is an option of supplying (advancing) a flexible pushing support into the barrel from an inclined chute.

Such opportunities for support are shown in FIG. 8 for example with a curved barrel.

The launch scheme in which the pushing support enhances the movement of direct carrier piston is also quite feasible. In this case, the booster piston is excluded from the scheme, and the pushing support is attached to the carrier piston (shown in FIG. 4).

In this scheme, the exhaust gases from reaction engines of the carrier piston (and gases from charges, which will be discussed below) will be dispersed over a greater length of the launch barrel, but in a small volume of clearance between the barrel and the support (in the case of a support in the form of a hollow cylinder), which will not reduce their effectiveness, but will only change the dynamics of their impact.

Also, to enhance the advancement of all pistons and support (in the corresponding variants of the launch schemes), gunpowder gases are used, which are generated from charges that are triggered from the bottom (at the beginning of acceleration) and from the walls of the launch barrel into the volumes under the carrier and booster pistons and into the volume under the pushing support in the increasing dynamics as the elements are being accelerated.

In the case when the pushing support advances the carrier piston directly, it is also envisaged that the powder gas-emitting charges from the upper constricted part of the pushing support are triggered into the volume under the carrier piston into the zone of the most effective action of gas pressure close to the piston, which will strengthen and accelerate the acceleration of the bundle—carrier piston-pushing support and reduce not effective dispersion of gases along the length of the extended gap (clearance) between the support and the barrel.

At the final stage of acceleration, even more powerful and high-speed amplifying pushing-out energy is used, which is formed from a booster piston and directed under the carrier piston, which will even more smoothly accelerate the carrier piston with the object before it is detached from the carrier piston and flies out of the barrel.

Increased impact of the gunpowder gases during the acceleration can be achieved by simply increasing the amount of gunpowder activated (for information, 1 l. of gunpowder gives 2,000 l. of gas) and the number of detonating charges.

The pushing-out energy that increases in dynamics (in speed and force) can be obtained using gunpowder charges first (reaction speed ~2 km/s), then in the form of fuel injection (reaction speed ~5 km/s) and at the end of acceleration in the form of metered detonation of non-brisant (non-crushing, non-destructive) explosives (reaction speed ~8-10 km/s), for example, directional injection of liquid explosives into the desired volume, which will eventually create a directional pushing out front of gradually increasing energy acting over a large cross-sectional area of the (carrier and supporting) pistons bottom and piston bottom of the pushing support through the damping cushion of gases compressed under them, without dangerous peak loads on the bottom of the pistons and nozzle.

(For information: all these gas and energy-generating substances are known. Their selection in increasing dynamics without dangerous peak loads will be accomplished with a specific design. It is also known that during an explosion of a rocket warhead flying at supersonic speeds, the energy and the striking fragments fly forward along the flight of the rocket with velocity addition. Therefore, the direction of the proposed impact from the booster piston flying in the barrel under the flying carrier piston and from the walls of the barrel itself into the volumes under the pistons and their joint one-way unidirectional rapid movement will be directed under the pistons, and not on the walls of the barrel, thereby, ultimately, smoothly increasing the acceleration of the object in the launch barrel)

We can also note that in a large, unlimited volume of booster piston, there is enough space for placing reaction engines along the devices for creating directed pushing-out energy and for brakes and for filling with lifting gas—helium. There is also enough space in the bottom and along the walls of the launch barrel to accommodate gas and energy-releasing devices.

Of course, in the volumes under the pistons with reaction engines, the gas pressure that is optimal for the process will be created without complicating the operation of the reaction engines adapted for this mode of operation. The proposed acceleration system involves the use of pushing-out gases accumulating under the pistons under a pressure of no more than 50 atmospheres (50 kg/cm$^2$), although it does not preclude the use of a higher pressure. Specific parameters will be refined for specific tasks.

(For information: The nozzle of the ordinary reaction engines can normally operate in a gas volume with a pressure of up to several tens of atmospheres. The Russian underwater jet torpedo-rocket "Shkval" (BA-111) works normally even in the sea water at the depth of 500 meters (50 atmospheres) at a deep launch, developing a speed of 100 m/s. It is clear that in our case the dynamics of the nozzle and its design will change; in heated pressured gases the speed of sound is higher, the thermal resistance is different etc. . . . so there will be a useful reaction of the support and the repulsion of the jets from a more dense medium than air, it is possible that the jets of the engines of the carrier piston are reflected from the booster piston—opposite surfaces, which will also provide additional lift force to the object's body and it will not adversely affect the body of the object since the object is separated from all this dynamics. All this and other factors will be taken into account in the specific design).

The acceleration system also includes using compression springs to facilitate the movement of system elements from the static position, prevention of collision of the elements and for braking elements at the end of acceleration.

For increasing the acceleration rate of the object during its acceleration in the launch barrel, the launch barrel itself is accelerated in the direction of the object acceleration and the object is detached from the carrier piston in the form of a mortar launch at the end of the acceleration in the barrel, which will provide the combined velocity of object's departure from the barrel which equals to acceleration rate of the object in the barrel plus the velocity of the barrel acceleration plus the velocity of the mortar detachment. This launch and acceleration scheme is shown in FIG. 5.

In this case, the return (recoil) from the mortar launch of the object detachment is used for braking the carrier piston and the launch barrel.

Moreover, the mortar barrel and the supporting frame (used for the mortar detachment of an object and located on the carrier piston) may also have an increased diameter (greater than the diameter of the rocket in the section of its nozzles), or even be equal to the inside diameter of the launch barrel (in the latter case the mortar barrel will be the upper part of the launch barrel at the length of the implementation of the mortar detachment and acceleration), which will further increase the safe expelling force (and, accordingly, the acceleration of the object) and the braking recoil (for stopping stop the carrier piston).

Mortar detachment of an object, at a certain acceleration stage, can also be used for rescuing jettison and departure of an object from a launch barrel in the event of emergency which requires it.

(For information: Such jettisons are known in principle for rescuing the payload and crew when heavy rockets are launched using a well-known conventional method. In the proposed saving jettison, the entire object will be saved with more payload-carrying mortar detachment—this is a difference that should not complicate the formula).

(For information: It is known that when firing from a ship which moves in the direction of the shot, the velocity of the projectile equals to the velocity of the ship combined with the velocity of the projectile in relation to the ship. Similar dynamics will occur for the proposed method of acceleration of the object. Increasing the number of systems accelerating one the other, will make it possible to achieve a tremendous speed of departure of an object from the inner barrel or movement of an object inside relative to the Earth.

For the movement and acceleration of the launch barrel, the invention provides for use of drives (adjustable in force, speed and direction), reaction engines, compressed gases, pushing out force of water, extension of the barrel from the tube or cylinder, location and movement of the barrel with a slope to provide the desired angle of elevation at the object's departure from the barrel.

When extending the launch barrel from a barrel or cylinder using its bottom reaction engines and gunpowder and exhaust gases, a large area of the barrel bottom converts the pressure of the resulting gases under it into a huge lift force (similar to the principle of lifting the carrier and booster pistons) that makes the barrel "weightless" and easily accelerated.

At the same time, in order to reduce the depth of the acceleration system and to simplify it, the pushing support is excluded from the scheme.

For accelerating the launch barrel using the pushing-out force of water, the barrel adapted for this purpose is pushed into the water, for example from a floating offshore platform, secured (fixed) in this position, and during the launch the barrel is released for the lift produced by the pushing-out force of water, which according to Archimedes' law equals to the weight of the fluid displaced by the barrel.

Moreover, for the useful transformation of the enormous excessive pushing-out force of water into an increase in the final speed of the object's departure from the launch barrel, the launch barrel is made telescopic (see FIGS. 6 and 7), consisting of large number of sections linearly moved one into the other using polyspast or geared section connections, which converts the extension of the outer section of the barrel (receiving the pushing-out force of water into a more accelerated advancement extension and opening of the inner section of the barrel in which the object is accelerated at the same time on the carrier piston.

At the same time, it is taken into account that the pushing-out force decreases as the barrel is lifted out of the water, as the volume and weight of the displaced water decreases accordingly, and the increase in the speed of extending the inner section diminishes the force for its extension—speed polyspast or geared connection.

For increasing the pushing-out force and correspondingly the launch payload capacity, it is possible to use a higher density fluid, for example, pushing-out and accelerating the launch barrel from a cylinder filled with mercury—Hg (its density is 13,520 kg/m3, 13.5 times heavier than water, the heaviest liquid), then launch payload capacity will increase by 13.5 times more. This will also reduce the depth of submerging of the barrel into the liquid for obtaining the same pushing-out force as with water. Building a special deep pool will required for heavier fluid.

The extension of the telescopic barrel sections (except for their extension as a result of the action of pushing-out force of water or other liquid) is also carried out with the help of their reaction engines located on the bottoms and on the upper external part of each barrel section, and for the leading external barrel section also by using its electromechanical or diesel or any other suitable adjustable power drive.

In this case, winding the cables of the polyspast system on the corresponding external drives (see FIG. 7) (instead of the variant of their static mounting, (see FIG. 6) will accelerate and simultaneously increase the extension of the barrel sections even more.

Moreover, between the bases (bottoms) of each section, exhaust gases will accumulate (from the work of the reaction engines of the sections) that will help advancing the sections by their pressure, while the gases in the volumes under the bottoms of the sections can be compressed by the corresponding booster pistons (see FIG. 7), which will further increase their lifting pressure or will not allow the pressure to fall.

(For information: The said reduction connection of sections for increasing the speed of extension of the inner section of the telescopic barrel is not shown in the figures. Gearcases for converting the translational motion of the leading element (in our case it is the external section) into a more accelerated advance of the driven element (internal section) are known and if necessary will be applied at the stage of a specific design. For example, a polyspast mechanism was chosen, which is easier to design, explain and test and which in principle is also a gearcase).

I would like to note that without polyspast, jet and drive increase in the speed of the barrel elevation, the speed of elevating the single-section barrel only due to the action of the pushing-out force of water (according to Archimedes law) will be insufficient, although quite acceptable, with a huge excess of lifting force.

With a telescopic structure of the launch barrel using the bottom reaction engines of the outer section of the barrel and its drives together along with the pushing-out force of water, it is quite possible to accelerate and lift the outer section of the barrel from the water at a speed exceeding 100 m/s. This means that with the simplest one-stage polyspast connection of the sections of the telescopic barrel of 3 sections, the inner section will extend at a speed of more than 400 m/s (external barrel—100 m/s, middle barrel—100×2=200 m/s, internal barrel section 200×2=400 m/s, for details, see the description and calculation for the FIG. 6.). This can be verified, without understanding the calculation, by a simple measurement with a ruler of constant lengths of sections and cables and the distance traveled on the scale FIG. 6.

With winding the cables of a polyspast system by the drives which increases the acceleration, increasing polyspast stages and the number of sections along with acceleration on the barrel pistons inside the barrel, acceleration of the object-rocket in the inner barrel and the final mortar launch by detachment, the velocity the rocket departure with huge payload can reach 2000-6000 m/s (2-6 km/s) and even more (see calculation and description for FIG. 7).

After ignition of the high-speed reaction engines of the rocket after its departure from the barrel (with an already accelerated rocket, engines, with increased speed of jet stream departure, with sufficient thrust, are needed. I have developed such an engine that differs from all the known ones, my next patent), the combined velocity of the rocket flight will be even higher (the issue of thermal protection, noise reduction and shock wave can also be worked out for the future).

- (For information: "Shkval" rocket-torpedo, which has already been mentioned, flies under water at a speed of 100 m/s in a gas cavern, mainly in order to reduce the front drag. In the proposed launch, the barrel will not encounter frontal water drag, but only friction of the outer side walls, which is easily minimized by hydrophobization of the surface and other known methods. So the acceleration of the outer section of the barrel out of water at a speed of over 100 m/s is quite possible, especially with a much larger specific (per unit of weight) acceleration power and the aid of pushing-out power of water, "Shkval" does not have this power. Then with the proposed example with three-section telescoping barrel, the inner section departs from the water with a bullet velocity—over 400 m/s.
- By the way, the "Shkval" uses outboard water as an oxidizer—fuel based on aluminum, magnesium, lithium, it is quite possible that we also will use the above for underwater reaction engines of the barrel).

The volume behind the barrel flying out of the water will be filled with exhaust gases from the operation of these reaction engines of the outer barrel section, which will exclude the formation of a harmful separating flow, bottom braking, cavitation, fracturing. The formation of gases in the water volume behind the bottom engines will not affect the enormous pushing-out force of water pushing the accelerating barrel, as the barrel lifting speed will be much higher than the speed of ascent of gas bubbles, which will disperse, carried by the flow and will not disturb the stability and buoyancy of marine launch platform.

Of course, the ballast calculation of the floating launch platform, cushioning of the launch, stopping of the barrel sections without impacts, vertical without incline fixation of the barrel in the water and in the process of its opening, etc., will be performed. For example, for fixing the barrel without incline in the water, I have worked out a solution with retractable rods for pushing (immersing) the barrel into the water, holding and lifting out of the water. All of these are secondary solutions to the task that will be performed during the specific design process.

Also, due to the huge lifting pushing-out force of water and the high speed of the extension of the inner section of the telescopic launch barrel, it becomes quite effective and possible to accelerate and launch the object only by accelerating the inner section without accelerating the object inside it, which is reflected in the description for FIG. 6

A floating launch platform (using pushing-out energy of the water) will allow launching a huge payload from the Earth's equator sea line (at a suitable depth), which will increase the speed of tangential acceleration of the object in the direction of Earth's rotation by 4.64 km/s and the launch capacity (Earth rotates around its axis in the direction from west to east at a speed of 4.64 km/s, and this has long been known to facilitate and reduce the cost of launches from the equator).

The proposed system and method also provide for the use of Earth's gravity force to facilitate the initial acceleration of the object in the launch barrel (see FIG. 8). In order to accomplish that, the launch barrel (not telescopic and not accelerated) has (is made with) a curved configuration, which from the mounting preparatory horizontal section (where the object and the pistons are inserted into the launch barrel and the pushing support is attached) smoothly goes downwards (the section of the barrel of the forced free fall of the object, pistons and supports), and then up. This allows at the initial stage of acceleration (the most intense and energy-consuming) to use for facilitating the initial movement and acceleration of the elements of the system, the force of the Earth's gravity, instead of spending energy to overcome it. It will also reduce the vertical dimensions of the acceleration system.

Amplified fall of the object and elements of the accelerating system is provided by the action of reaction engines thrust of the carrier and booster pistons, compressed gases (exhaust and gunpowder) and pushing support force, which in this scheme is flexible and advances (is inserted into) in the launch barrel at an increasing speed greater than speed and acceleration from the free fall. The flexible pushing support is wound on the drive drum in a fixing cassette before the launch, and during the launch it moves with force in the launch barrel in an adjustable mode. There is also a variant of the location of the flexible pushing support in the fixing chute inclined in the direction of inserting it into the barrel, from which it is inserted into the barrel with the help of external drives controlled by force, speed and direction.

It is assumed that such a flexible pushing support can advance directly the carrier piston, then the booster piston is excluded from the scheme.

There is also a possibility of a deep (non-cantilevered) fit of the object fastening into the volume of the carrier piston for better fixation of the object during the passage of sections with the bend of the barrel, damping of the barrel cushioning, the possibility of rotation of the pistons along the advancement axis, and so on. (These are all related problems that will be solved with a specific design).

- (For information: In principle, the acceleration of an object—bullet in a curved barrel is known with a smooth bend of the barrel up to 90°. In the USA, Germany, Russia, samples of such small arms were created a long time ago—Reising submachine gun and Mauser rifle in USA; shooting from around the corner, from the tank hatch, curvilinear attachments TKB-450A, TKB-451, USSR; assault rifle or curved barrel (Krumen Lauf) Hugo Schmeisser, Haenel company, Germany, the barrel withstood ~2,500 shots.

The curvilinear (curved) configuration of the railgun acceleration barrel has the said Russian system. previously indicated.

So, my proposal, regarding curvature, is quite feasible).

Also, for all variants of launch schemes, compression springs are used to facilitate the setting in motion of the accelerating system elements from static position, preventing collisions of elements, ensuring the intervals among them, and for braking the elements of the launch system.

The system and the method also include creating and maintaining vacuum in the launch barrel in the volume above the carrier piston, both before the launch and during the period of actuals launching and acceleration of the object in the barrel, which allows to use the propelling force of the vacuum (arising from the pressure differential above and below the carrier piston) to move the carrier piston, as an additional source of lift and acceleration and to reduce aerodynamic drag for the entire period of acceleration in the barrel of the carrying piston with an object.

Vacuum generation inside the stationary (non-accelerated, non-movable) launch barrel prior to system launch and during the period of direct acceleration can be carried out with the help of known vacuum pumps without any problems.

For creating vacuum inside the accelerating barrel, the vacuum devices should be located outside the barrel and moving along with the barrel, they should not be (constitute) an additional burden or load on the launch barrel. The solution has been found—it can be an elector (jet vacuum pump) of the jet type, which uses as a jet propellent, the jet stream of the acceleration engine located outside the barrel, which simultaneously also accelerates the barrel. This feature is not shown in the figures.

Also, before the launch, it is planned to fill with light buoyant (lifting) inert gas, e.g. helium, the following volumes of the acceleration system: the volume of the launch barrel above the carrier piston, the volume of the barrel beneath the carrying and booster pistons, the internal volume of the hollow pushing support, the free volumes of the carrying and booster pistons and other suitable elements.

Elements filled with helium become lighter and less inertial, which will facilitate their movement and braking. Buoyant helium in volumes under the carrier and booster pistons will try to lift the pistons, which will facilitate their initial movement during the launch of the system. Helium will reduce friction, resistance and heat as the elements move up. The helium in the volumes can also be used instantly in the event of an emergency. If a vacuum is created in the barrel volume above the carrier piston, the lighter carrier piston (due to its filling and support with helium from below) will move more easily into acceleration due to the vacuum above it. In case of filling with helium the launch barrel above the carrier piston (when the vacuum is not created above the piston), helium, which is lighter (by 7.62 times) and more slippery than air, helium is easier to displace from the barrel with less friction and heating when the carrier piston moves. The head surfaces of the carrier piston and the object, the surface of the mobile contact will also become less heated. Filling the barrel with helium will also increase the vertical stability of the barrel (for information and understanding without theory: a sealed rubber-coated long hollow fabric hose cannot be fixed in an upright position, but filling it with buoyant (lifting) helium will easily put it into a vertical position, i.e. increase and create its vertical stability).

In order to prevent helium evaporation or coming out of the barrel prematurely, it is held in the barrel by a diaphragm or a sealant over the upper part of the barrel, which are opened a moment before the launch. When launching in windless weather, helium coming out of the barrel will create (form) a helium column with less resistance, less aerodynamic heating and a smaller shock wave for the object flying through it from the launch barrel.

The proposed launching system and method provide for control and regulation of: modes of acceleration of the object in the launch barrel; mode of braking and return of the system elements to their initial positions; speed and force of acceleration of the object in the launch barrel; speed and force of movement of launch system elements; payload capacity of the launch; direction of movement of the elements. It is also possible to change the launch schemes.

Control and regulation of speed and force of acceleration of the object and its payload capacity are carried out due to: change of speed and force of advancement of carrier and booster pistons, pushing support and movable barrel (both single and telescopic); change of pressure and quantity of ejection gases by controlled switching on or off the action of gas and energy emitting elements (devices) and relief of pressure of formed gases from all (corresponding) volumes by means of controlled valves; change of speed and force of electromechanical (and other suitable) drives of the pushing support and the (movable) launch barrel; switching on and off the operation of reaction engines of the launch system elements (if possible); controlled switching on and off of the (friction, jet) braking elements of the pistons, pushing support and the barrel; changes in the depth of the barrel's immersion in water (for the launch scheme with the use of the pushing-out energy of water); activating or deactivating the various elements of the acceleration system.

(For information: At the conventional heavy rocket launches, it is almost impossible or difficult to control the thrust and velocity of the jet stream from the reaction engines during their operation. According to the proposed method and system to control the parameters of pushing-out gas and energy (compress, add, reset them) and the drives moving and accelerating the system elements and through them the speed, force and payload capacity of the object (such as rocket) acceleration is actually possible and easy in a wide range and different combinations, which is a different application of the novelty and proposed method and system).

The acceleration system and its elements are braked (to prevent their departure from the barrel) immediately (instantly) after the object is detached from the carrying piston (to prevent the loss of the object's speed of the previous acceleration). Braking is carried out by (through): pushing-out gas pressure relief from all volumes by using the opening valves; stopping (switching oil) the operation of the acceleration reaction engines of the pistons, the pushing support and the barrel; stopping the operation of gases and energy emitting devices; slowing down and disconnecting the drives; activation of jet braking of pistons, pushing support and barrel; activation of friction brakes of pistons, support and barrel; compression of brake springs and effect of recoil of the mortar detachment of the object from the carrier piston at the end of its acceleration in the launch barrel (in accordance with different schemes).

Moreover, it is provided that the capabilities of the braking system, slowing down the acceleration and pressure relief of gases at a certain stage of acceleration can provide cease of acceleration of the object in the launch barrel and its non-flying out from the barrel in case of emergency or a rescue detachment of the object and its release from the barrel, for example, mortar detachment, with subsequent parachute or other safe landing on land or on water, and also to provide hovering and moving (up and down) in the barrel of the carrier piston with the object, without flying out of the barrel, with operating acceleration reaction engines of the pistons and the support (quite achievable design mode) for testing and adjustment of the launch process of the scaled-down experimental model of the system with a transparent barrel (for visual control of the position of the elements).

Return of the system to its original position after the object's departure from the launch barrel and braking of the system elements is carried out with the help of reversing the drives of the elements and elements' own weight. The springs between the elements and braking prevent their collision. Return of the carrying piston which is not connected to the pushing support in the curved barrel is carried out by (through) pumping air into the sealed volume of the barrel above it.

Some features of braking the elements of the acceleration system, detachment and departure of the objects from a launch barrel while using a protective cocoon around the object (see FIG. 9).

The reinforced piston and support structure will withstand braking overloads of 100 G. However, even with this extreme braking overload, at very high acceleration speeds, a longer braking distance in the barrel is required for braking, for e.g. of the booster piston (which does not fly out of the barrel), i.e. an increase in the length of the launch barrel, which is the sum of acceleration and braking lengths.

The object, for example a rocket, is detached from the carrier piston (which does not fly out of the barrel) a moment before its braking and must fly through the barrel without hitting its walls, a distance which at least equals to the length of the braking distance of the carrier piston, which is moving further away from the rocket, stops at the top of the barrel, and the rocket flies out.

In this case, in order to prevent possible damaging contact of the flying rocket with the inner walls of the barrel, it is planned to have (use) a protective cocoon around the rocket and under its base (bottom), installed in advance or formed during the process of detachment of the rocket from the carrier piston (e.g. opening of the airbags in the event of impact of the vehicle).

The cocoon also protects the rocket (object) from the possible excessive noise pressure and other influences of the powerful reaction engines operation of the carrier piston and the mortar detachment of the rocket.

The cocoon can fly out of the barrel with the rocket, after which the rocket is separated from it, or remains in the barrel when it reaches the top of the barrel after the rocket has been detached from it. The cocoon flying out of the barrel may have reaction engines to continue acceleration after the detachment from the carrier piston and to fill with gases the barrel volume behind the cocoon to prevent the formation of a braking vacuum and a tear-off volume (current), may have screw-shaped elements (ribs) to make the rotation of the stabilizing linearity of the detachment, departure and flight of the rocket. If the cocoon is ejected from the barrel, it will still land safely . . . .

Good lubrication and sliding of the cocoon will not significantly reduce the velocity its movement in the barrel (the same is true for the other moving elements of the acceleration system).

The rocket can be detached from the cocoon in the form of a second additional mortar launch (the primary mortar detachment was from the carrier piston), which will increase again the acceleration of the rocket and facilitate its separation from the cocoon.

The protective cocoon will be made of elastic fire-resistant cellular material filled with helium gas, which will increase its protective properties (for the rocket it contains) against possible shaking, vibration, noise pressure, peak loads and in an emergency situation during the acceleration and launch, departure and detachment of the rocket (object), as well as reduce the weight and inertia of the cocoon to facilitate acceleration, braking and safe landing on land or on water after departure and separation from the rocket. When separated from the rocket, the cocoons may be opened and divided into parts.

When the carrier piston is ejected from the barrel, the barrel will be much shorter because the length of the barrel, which is intended for the braking distance of the carrier piston, will be excluded or sharply reduced.

Also, if the carrier piston is ejected from the barrel, the need for a protective cocoon may be eliminated, as the risk of contact between the object and the walls of the vertical launch barrel will be sharply reduced. However, we will still use the cocoon to ensure that there is no dangerous contact, which will be shown in the examples in FIG. 9.

In this case, the separation of the cocoon with the object (rocket) from the carrying piston, during their movement in the barrel at the end of acceleration, will be safer, coaxial and fixed by the walls of the barrel. The carrier piston will start braking before its departure in the barrel at the end of acceleration, and the cocoon with the rocket in it will detach from the carrier piston before the start of braking of the carrier piston, so that the speed of the previous acceleration of the rocket in the barrel will not decrease.

The examples (FIG. 9) show three variants of rocket launch from the barrel using a protective cocoon around the rocket.

The system and method of launching and acceleration of the object provide for different variants and combinations of the use of system elements, operating forces and factors in different types of combinations, of exceptions and quantities.

For example, the system and method may not use or contain elements and factors for: mortar detachment of the object from the carrying piston to reduce the overload when the object is launched with the crew; use of the pushing-out force of water, Earth's gravity, gunpowder gases and increasing pushing-out energy, vacuum, buoyant helium, etc.

For example, it is definitely possible to accelerate an object to the speed of a bullet using only the accelerated extension of the inner section of the telescopic launch barrel. The booster piston can only move in the barrel by an action of the pushing support with the drives without reaction engines, or can be excluded from the scheme altogether.

Energy releasing devices (reaction engines, charges, etc.), drives, energy discharge devices (valves), braking and other system elements can be present at least in quantity of one unit.

Of course, all of these differences will affect the power and speed capabilities of the acceleration system and its performance.

In the proposed launching system and method, the use of exhaust gases from the operation (action) of reaction engines, the pushing-out force of water, Earth's gravity, initiating movement vacuum, buoyant light gas and the release of compressed before the launch spring are huge sources of free energy for the period of direct acceleration of the object in the launch barrel or with the help of the barrel.

Some variants of the system and method applications are presented in the examples of a particular version in FIGS. 1-9.

According to the calculation presented below, the proposed launching system and method will be able to accelerate an object weighing 640,000 (six hundred and forty thousand) tons to the speed of ~5 km/s (and even a greater mass to a greater speed) in a launch barrel with diameter of 30 m and gas pressure of 10-20 atmospheres (kg/cm$^2$), The length of the launch barrel can be in the range from 0.5 km to 6 km, the diameter of the launch barrel is in the range of 10 m.-100 m. The system allows to accelerate the object with the rate of acceleration (overload) from 5 to 100 G.

It is quite possible to reduce or increase all these unlimited parameters in a specific design for a particular purpose The proposed launching system and method with small element sizes will also allow to launch the known heavy rockets (if the cylinders of their stages are strengthened and adapted to a new launch) with many times higher (heavier) payload.

The proposed launch method can be combined (used together) with electromagnetic and electrodynamic acceleration.

If necessary, the system may provide for cutting off, not releasing the exhaust and gunpowder gases from the launch barrel, and launching the rocket engines at a significant height after the departure from the barrel with heat shielding from the jet stream to obtain a subtle (non-signature) launch and flight of the rocket in the IR and UV (infrared and ultraviolet) detection ranges (cutting off the powder gases, their non-departure from the barrel after the firing is known).

Huge payload of the proposed launch allows to apply (use) unlimited by weight reliable protection of the object and the crew from space radiation, electromagnetic peaks and micrometeorites for (at) extended and long-range flights.

(For information: relative motion of system elements, their large surface and capacity, arising pressure, temperature, friction, etc., at the corresponding structure of elements, will allow to receive a huge quantity of free (accompanying) electricity and potential (all power conversion principles for this purpose are known for a long time) for increase of acceleration, for combination of the offered acceleration with an electromagnetic method of acceleration, for decrease in noise and formation of a shock wave both in the period of acceleration of the object in a barrel, and after the departure of the object (a huge rocket for example) from the barrel, and also creating energy potential for obtaining striking, defensive and creating disturbances action in case of military use of the launch and the object. For instance, it is known and practically tested that optical air puncture in front of the plane (flying with supersonic speed), using frequent powerful laser pulses, leads to the formation of high-temperature plasmoids, the heat trace of which sharply reduces the power of the shock wave and noise.

It is clear that the abovementioned huge amount of free electricity will provide the same result for the proposed acceleration, departure and flight, for example, of a giant rocket without a shock wave and noise emanating from it.

Illustrative Examples

The provided examples are intended to facilitate (aid) understanding of the principles of the proposed invention and do not intend to limit (limit and specify) the scope (range, field) of a large number of possible combinations of its implementation.

The examples below begin with a simpler scheme and then become more complex and combined as the proposal is understood and developed.

The calculation of the payload (lifting capacity) and speed capabilities of these examples for specific selected (taken) parameters will be presented below after the description of the examples.

In the examples, a giant rocket with a huge payload has been selected as the object for acceleration and launch.

The possibility of acceleration of several objects in one launch is not mentioned in the examples since, it is in principle, quite a solvable problem, which, if necessary, will be solved in the process of a specific design.

Launching an object, for example, a super-heavy rocket (1), according to the scheme presented in FIG. 1, is carried out as follows:

FIG. 1*a*. Position of the system before launch and preparation for the launch.

In this launch scheme (FIG. 1) and in some subsequent schemes (FIGS. 2, 3, 4, 8), the launch barrel (3) does not move during the launch, i.e. it is stationary and can be installed vertically or with a slope or be bent (FIG. 8) using the terrain relief, mine for its location. The elements of the launch barrel (3) fixation (tension cables, supports, shock absorbers, relief, etc.) are not shown for clarity.

The rocket (1) is mounted on the carrier piston (2). Depending on the position and the structure of the launch barrel (3), the rocket (1) can be mounted on the carrier piston (2) through the top of the launch barrel (3) or through the opening side of the barrel. Finally, the carrier piston (2) with the rocket (1) must be placed in the lower part of the barrel (3) on a compressed spring (4) before the launch, the unlocking (release from compression) of which during the launch will facilitate the beginning of the carrier piston (2) movement (The elements of compression, fixation and unlocking—release of the spring are not shown for clarity as secondary design elements). The spring (4) also provides the necessary clearance (interval) between the bottom of the piston (2) and the base of the barrel (3).

Then, the launch barrel (3) is sealed and air is evacuated from the barrel volume (3) above the carrier piston (2), which is continued during the launch and the acceleration, which will significantly facilitate further (future) beginning of movement and ascent of the carrier piston (2), with a rocket (1) on it due to the occurrence of pressure drop (difference) and reduction of aerodynamic acceleration resistance (ejectors—vacuum pumps for air pumping are not shown for clarity as secondary elements).

As a variant, instead of creating a vacuum in the barrel (3) above the carrier piston (2), the said volume is filled with helium before the launch, which will also reduce the resistance of the carrier piston (2) during the launch, as helium is much lighter (7.26 times) and slippery than air, it will be more easily displaced from the barrel (3) with less resistance and heating. During the launch, the top of the barrel (3) will be depressurized (opened) to allow the helium to freely escape and to be displaced out of the barrel (3) as the piston (2) moves upwards.

It is also planned that the free volume of the carrier piston (2) will be filled with the buoyant inert gas, helium, which will reduce its weight and thus facilitate its acceleration and braking, as well as allow for instant use of helium in the event of an emergency.

FIG. 1b. Launch of the system and acceleration of the rocket by means of the system. After control and blessing, the reaction engines (5) of the carrier piston (2) are activated. The spring (4) is released accordingly, which facilitates the beginning of the piston (2) movement upwards. The bottom-base of the launch barrel (3) will constitute the support surface for repelling outgoing jet streams of the engines (5), which at that moment will increase the movement of the carrier piston (2), in addition to the action of the jet thrust and the accumulating buoyant (lifting) exhaust gases.

The resulting exhaust gases (from the engines (5)) move into the closed volume (6) between the bottom of the piston (2) and the base of the barrel (3) and their pressure (converted into a huge lifting force due to the large area of the piston (2)) also contribute to the movement of the piston (2) up inside the barrel (3).

As the piston (2) progresses, the volume (6) below it will increase and be filled with exhaust gas. Without additional reinforcement, the speed and force of the piston (2) movement will stabilize, but no intensive and increasing acceleration will be provided.

In order to increase the movement and the acceleration of the carrier piston (2), gunpowder charges (7) from the bottom and barrel (3) walls to the volume (6) under the piston (2) are detonated (activated) with increasing dynamics during the movement and the acceleration of the carrier piston (2) with the rocket (1) up in the barrel (3).

FIG. 1c. Departure of the rocket from the launch barrel and braking of acceleration system elements.

When the rocket (1) on the carrier piston (2) reaches the top of the launch barrel (3), it (1) is detached from the piston (2) (which at that moment starts to brake) and leaves the launch container (8) (or from the additional mortar barrel, the same numbering) outward, leaving the launch barrel (3) and fires its reaction engines to continue acceleration if necessary.

The detachment of the rocket (1) (regular or mortar) from the piston (2) is performed before the piston (2) starts to lose its speed due to its braking to prevent decreasing velocity of departure rocket (1). While the return of the mortar ejection/release of the rocket (1) from the piston (2) will contribute to the braking of the piston (2) in addition to other braking factors.

A moment before the rocket (1) is detached and departs, the sealing gate (9) holding the vacuum in the barrel (3) opens. (If the barrel (3) is filled with helium, the sealing gate (9) opens during the launch period or a moment before the launch and moving up of the piston (2)), all power sources (elements) intended for acceleration cease to operate (in reaction engines (5) of the piston (2), at that moment, simply run out of fuel or they are switched off), the activation of gunpowder charges (7) is stopped, the valves (10) of the compressed gas pressure relief are opened and the jet (11) and friction (12) braking of the upward movement of the carrier piston (2) is activated, which also at the end of its way (if it approaches) will be smoothly braked without impact by compression of the shock-absorbing braking spring (13), the means of vacuum generation in the barrel are deactivated. It is also possible to release gases from under the carrier piston (2) upwards, which will cause (create) a reaction for braking it.

At the same time, the launch container (or additional mortar barrel) (8), in addition to ensuring that the rocket (1) is straightened out during acceleration and take-off, will also protect the rockets (1) and prevent the rocket from being affected by the jet brakes (11).

(For information: if for any reason, the sealing gate (9) does not open, the upper part of the launcher container or the mortar barrel (8), or the head part of the rocket (1), specially designed for this case, will simply penetrate the sealing gate to continue the normal flight. In the prototype the membrane is broken through).

It is also quite possible to cushion (to amortize) the launch barrel (3) separately, both for the launch period and for the braking period.

After braking, the piston (2), under its own weight, air support and friction braking, descends down smoothly to prepare the next launch.

Control and adjustment of the acceleration mode (speed, force) of the rocket (1) in the barrel (3) in this scheme is carried out due to (by) changing the number of detonated (activated) charges (7) and pressure relief from under the piston (2).

Please also note that the pushing-out energy of the exhaust and gunpowder gases in this scheme will not be effectively dispersed along the entire length of the launch barrel (3) behind the advancing carrier piston (2). It will be relatively difficult to change the force of its impact for changing the acceleration modes. However, this simple scheme will provide non-intensive acceleration of the rocket (1) with a huge mass in the launch barrel (3).

FIG. 2. Launching the rocket according to the scheme represented in FIG. 2, supplemented by a booster piston (14) (as opposed to FIG. 1) is performed as follows: (To avoid repetition, the similar actions described earlier in this and subsequent schemes will be described (outlined) in less detail or excluded from the description).

FIG. 2a. Position of the acceleration system before the launch and beginning of the launch and of the acceleration:

The rocket (1) is mounted on the carrier piston (2) located inside the launch barrel (3) in its lower part. Below the carrier piston (2) there is a booster piston (14). Between the carrier piston (2) and the booster piston (14) and between the bottom of the booster piston (14) and the base of the launch barrel (3) there are compression springs (4), the unlocking (release) of which from compression during the launch period will facilitate initiating the movement of pistons (2) and (14). The springs (4) also prevent the elements from colliding and ensure the smallest safe distance between them.

This scheme also (as in FIG. 1) provides for the evacuation of air (vacuum generation) or filling the barrel volume (3) with helium above the piston (2).

Launch. The reaction engines (5) of the carrier piston (2) and the reaction engines (5.1) of the booster piston (14) are fired up. The resulting exhaust gases (from the operation of these engines) fall into the closed volumes (6) and (15) under the pistons and their pressure (converted into a huge buoyant force due to the large piston area) together with the jet thrust of the engines (5), (5.1) and the impulse of the springs (4) unlocking (release) start accelerating the carrier piston (2) with the rocket (1) and the booster piston (14) up in the barrel (3), while the spring (4) attached to the booster piston (14) will prevent the pistons (2) and (14) from colliding and will provide an interval between them in any mode.

FIG. 2b. Acceleration of the object-rocket (1) in the launch barrel (3) using all energy sources for acceleration according to this scheme:

In order to increase the propulsion and acceleration of the pistons (2) and (14), gunpowder charges (7) from the bottom and the walls of the barrel (3) are detonated (activated) into the volume (15) under the booster piston (14) in the increasing dynamics as they move and accelerate.

The booster piston (14) will follow the carrier piston (2) at some distance from it. Gases will already accumulate in a much smaller volume (6) between the pistons (2) and (14), which will prevent the gases under the carrier piston (2) from dispersing along the entire length of the launch barrel (3) as the carrier piston (2) moves upwards, and will accordingly increase and enhance the acceleration process of the carrier piston (2) with the rocket (1) in the barrel (3). The force of advance movement from the booster piston (14) will be transmitted, through the damping cushion of the compressed gases in the volume (6) to the carrier piston (2).

FIG. 2c. Launch of the rocket (1) from the launch barrel (3) and braking of the acceleration system elements.

Detachment of the rocket (1) at the end of its acceleration, its departure, braking of the carrier piston (2) and release of gas pressure in this scheme is carried out in the same way as described in FIG. 1c.

Braking the booster piston (14) is performed in the same way as braking of the carrier piston (2), i.e. reaction engines (5.1) of the booster piston (14) are shut down and its jet (11.1) and friction (12.1) braking is activated.

After braking, pistons (2) and (14) are gradually descend.

This scheme, due to the presence of a booster piston (14), will significantly reduce the inefficient dispersion of pushing-out and buoyant (lifting) gases under the carrier piston (2) (compared to the scheme in FIG. 1), but it will not provide a fully intensive compression of gases under the carrier piston (2) and easy adjustment of the acceleration mode control. Nevertheless, this scheme will also provide acceleration of the object with a huge mass.

Launch of the rocket (1) according to the scheme presented in FIG. 3 with the use of a pushing support (16), increasing the movement of the booster piston (14), and a mortar detachment of the rocket (1) at the end of acceleration in the launch barrel (3) as follows:

FIG. 3a. Position of the system before the launch and beginning of the launch.

This scheme, in contrast to the previous one, is supplemented by a pushing support (16), which includes two main parts: a tubular hollow (in this example) support (16.1), which is connected to the booster piston (14), and a piston (16.2) in its lower part, which is similar to the booster piston (14) and also has acceleration reaction engines (5.2), reaction engines (11.2) and friction braking (12.2). (The hollow tubular part (16.1) can have inside elements enhancing its rigidity and form stability which are not shown for clarity, being secondary details).

In this scheme the booster piston (14) and the piston (16.2) have axial channels, (17) and (17.1) respectively for gas release and discharge. During the launch and acceleration period, the axial channel (17) of the booster piston (14) is closed at the bottom by a valve (10).

The carrier piston (2) is equipped with a mortar tube (8) with a rocket (1) mounted on the support frame (18).

Before the launch, the volume (6) under the carrier piston (2), the volume (19) of the hollow tubular part (16.1) of the pushing support, the volume (20) under the piston (16.2) and the free volumes of the carrier piston (2) of the booster piston (14) and piston (16.2) will be filled with the buoyant (lifting) inert gas, helium, which together will create a high potential for lifting force for the whole chain of elements during the launch into movement and acceleration.

Also by means of powerful electromechanical drive (21) of the pushing support (16) a reverse compression for cocking (compression) the spring (4) under the piston (16.2) on the frame is carried out, for obtaining a potential of energy for launching into movement of the pushing support (16) necessary in the period of launch after unlocking (release) of the compressed spring (4) (fixation elements are not shown for clarity).

Beginning of the launch. The reaction engines (5) of the carrier piston (2) are fired up. Exhaust gases from these engines start to accumulate in the closed volume (6) and create a buoyant (lifting) force, which together with the jet thrust of the engines (5) starts to move the carrying piston (2) upwards.

In this case, at the beginning of the launch, the outgoing jet streams of the engines (5) can be pushed away from the surface of the booster piston (14) located underneath, which at this point will increase the initial movement and the advancement of the carrier piston (2) upwards (harmful effects of different reflection waves will be taken into account).

FIG. 3b. Acceleration of the object-rocket with activation of all the acceleration elements according to this scheme.

After firing up the reaction engines (5) of the carrier piston (2), forming a cushion of the volume of compressed exhaust gases in the closed volume (6) between the pistons (2) and (14) and beginning of the upward movement of the carrier piston (2), reaction engines (5.1) of the booster piston (14) are fired up, reaction engines (5.2) of the piston of the pushing support (16) are fired up, the spring (4) under the piston (16.2) is released in order to facilitate the movement of the pushing support (16) with the booster piston (14) attached to it, the electromechanical drive (21) of the pushing support (16) is activated to increase its movement towards the acceleration upwards. (It is clear that the drives (21), e.g. six of them, will be evenly distributed around the perimeter of the pushing support, project tasks).

As the acceleration and advancement of the pushing support (16) and the respective movement of the pistons (2) and (14) increase, the gas-generating gunpowder charges (7) are detonated in the increasing dynamics in the volume (20) below the piston (16.2), first from the bottom and then from the walls of the launch barrel (3).

(For information: The sequence, the order of activation of the said elements in the acceleration mode and the mode itself will be identified and specified in the process of adaptation of the launch for a specific purpose and task, as it is usually done, some of them are provided in the calculations after these examples).

The exhaust gases from the reaction engines (5.1) of the booster piston (14), displacing helium (in the case of filling the volume (19) with helium) will escape to the volume (20) below the piston (16.2) through its axial channel—nozzle (17.1)), creating a small secondary thrust useful for increasing the movement of the pushing support (16).

In such case, the exhaust gases from the reaction engines (5) (5.1) (5.2) (the latter, after passing through the channel (17.1)), will accumulate in the corresponding volumes (6) and (20) under the pistons (2) and (16.2) and its pressure (converted into a huge force due to the large area of pistons), together with other forces, contribute to the accelerated and powerful advancement upwards of the carrier piston (2) with a rocket (1) of enormous payload capacity.

As a result, a system is formed in which the carrier piston (2) with the rocket (1), due to all the operating forces and compressed gases underneath it, becomes kind of "weightless" raised by the cushion of compressed gases, which hovers during the acceleration period in the barrel (3), which is especially easy to achieve with the help of an adjustable (by speed and force) drive (21).

This allows the jet thrust (its velocity vector equals to the velocity of the jet stream out of the nozzle, 4-5 km/s, as in the first stage of conventional rockets), engines (5) of the carrier piston (2) to use their power for a much greater extent for faster, more intensive acceleration of the carrier piston (2), and not for overcoming the gravity (weight) of the carrier piston (2) with the rocket (1). (In conventional known launches of heavy rockets, the acceleration rate increases very slowly, as it is necessary to overcome the gravity and spend large amounts of fuel and power on it, which determines their low payload as percentage of the total mass of the rocket).

The same ("weightlessness" and faster advance), but to a lesser extent, applies to the piston (16.2) also boosted by the compressed gases underneath it.

The ability to easily change the force and the speed of the pushing support (16), due to its controlled drive (21), will easily ensure the achievement of a state of "weightlessness" and hovering of the carrier piston (2) and achieving its increasing acceleration (due to controlled compression of gases), in addition to the many other, less controlled features, for achieving that, for example, due to changes in the number of detonated gunpowder gas-releasing charges (7) and their dynamics of action, due to the additional pushing-out energy, etc. which will be explained further.

Also, the presence of a powerful adjustable drive (21) of the pushing support (16) allows to compress gases in the volume (6) under the carrier piston (2) to the pressure higher than under the booster piston (14) and the piston (16.2). This makes it advisable to have an axial channel (17) (which is closed for the acceleration period) in the booster piston (14), the opening of which is for releasing the gas pressure from the volume (6) during the braking period (of which we shall talk later) will make it possible to discharge the gas more quickly and to speed up the braking of the carrier piston (2).

Further, at the final stage of acceleration from the booster piston (14) to the volume (6) in a direction under the carrier piston (2), even more powerful and high-speed amplifying additional pushing out energy is activated (22) which through a damping cushion of the compressed gases in volume (6) increases even more the acceleration of the carrier piston (2) before the detachment of the rocket (1) from it.

It should also be noted that an unforeseen minor seepage of the pushing-out and buoyant gases between the volumes of separated pistons, when they move in the acceleration process, will not have a harmful (negative) significant impact on the performance of the launch system in a short period of time during the acceleration of the rocket in the barrel.

Further, at the beginning of the section of the launch barrel (3) designed for braking the elements of the acceleration system, mortar detachment of the rocket (1) from the carrier piston (2) is effected.

FIG. 3*c*. Mortar detachment of the rocket and its flight out of the launch barrel, braking of elements of the acceleration system.

When the rocket (1) reaches the upper part of the launch barrel (3) (before the beginning of the braking section) on or in the carrying piston (2), the rocket (1) is released by a mortar detachment by detonating an ejection charge (23) from the carrying piston (2) under the frame (18). The ejection force and additional acceleration through the frame (18), which compensates for the peak loads and fixates the rocket (1), is transmitted to the rocket (1), which together with the frame (18) flies out of the mortar barrel (8) and accordingly from the launch barrel (3). After the departure, the frame (18) opens and separates from the rocket (1) (e.g. as a frame of the armor piercing projectile), which then fires up its engines to continue the flight.

(For information: It is clear that the rocket's elements and frame will be reinforced and adapted to the mortar detachment loads. The electronics of the guided rocket assisted projectiles can withstand an acceleration of more than 60 G when fired.) At that, the mortar detachment of the rocket (1), besides the final acceleration of the rocket (1) in the end of its acceleration period, also creates a recoil response for braking the carrier piston (2), which must be stopped or slowed down at the end of the acceleration.

The mortar barrel (8) and the frame (18), respectively, may also have a larger diameter (larger than the rocket diameter), which will increase the buoyant force of the ejection impact, increase acceleration of the rocket (1) and the braking recoil.

Mortar detachment of the rocket (1) from the carrier piston (2) shall be performed prior to the start of the loss of speed by the carrier piston (2) in order to prevent from falling (decreasing) the combined acceleration speed of the rocket (1) departure, which in this example equals the sum of rocket acceleration velocity in the barrel (3) and the velocity of the mortar detachment.

Then everything is the same as in the previous schemes: the sealing gate (9) is opened (in case of vacuum generation in the barrel—at the end of the acceleration; in case of helium filling—at the beginning of acceleration) and the braking and discontinuation of the acceleration of the elements of the launch system are activated by analogy, as in the previous schemes, the electromechanical drive (21) of the pushing support (16) is switched off (or turned off), the engines (5), (5.1), (5.2), charges (7) energy (22); the valves are opened (10); the jet (11), (11.1), (11.2) braking and friction (12), (12.1), (12.2), (12.3) are activated, braking of pistons (2), (14), (16.2) and support (16.1).

In addition, during the braking period, when the gas pressure in volume (6) is greater than in volume (19), the valve (10) under the booster piston (14) is opened to accelerate the pressure relief from volume (6) through the channel (17) (the small upward directed jet stream resulting from this relief will not affect the efficiency of the much more powerful braking of the booster piston (14) and the support (16) at the end of their acceleration).

When the corresponding elements come into contact, the compression spring (4) between the pistons (2) and (14) and the spring (13) at the top of the launch barrel (3) become effective for braking. At a certain stage of braking, it is definitely possible to use for braking the deceleration and reversing the drive (21).

After braking, the carrier piston (2), the booster piston (14) and pushing support (16) (and, accordingly, the piston (16.2) being a part of the support) under their own weight and with the aid of reversing the drive (21) smoothly return (descend) to the level of the system preparation for the next launch.

As a result, this scheme of the launch system, thanks to additional elements (pushing support with a powerful adjustable drive and reaction engines, increasing pushing-out energy from the booster piston and mortar detachment) will eliminate all the disadvantages of the previous schemes—FIGS. 1,2 and will significantly increase and enhance the acceleration of the object (in these examples of the rocket) in the barrel and reliably and easily control (increase, accelerate, slow down) the acceleration mode.

This acceleration scheme (which has a high acceleration speed and a correspondingly long braking distance for stopping the carrier piston in the barrel) also allows for the launch of the carrier piston (2) from the barrel (3), which will reduce the length of the launch barrel (3) by the length of the braking path of the carrier piston (2) and eliminate the use of a protective cocoon, which, if the carrier piston does not fly out of the barrel, prevents direct contact of the rocket with the walls of the barrel after its separation from the carrier piston. These departure features, using a protective cocoon, will be set out (described) below for FIG. 9.

FIG. 4. The scheme of launch with the use of a pushing support also provides a variant when the pushing support enhances directly the advancement of the carrier piston and is attached (connected) to it. In this case, the booster piston is excluded from the scheme. This scheme is shown in FIG. 4.

In this scheme, the pushing support (16) is connected directly to the carrier piston (2) by means of a movable connection (24) to allow axial rotation of the carrier piston (2) from the action (factor) of the radial inclination of the jet piston streams (5) of the carrier piston (2) (rotation by changing the inclination of the thrust vector of the engines).

The rotation of the carrier piston (2) will provide a stabilizing flight rotation to the rocket (1) at its detachment at the end of acceleration. Changing the direction of the rotational thrust will be carried out during the corresponding acceleration section.

Part of the support (16) in the area of connection to the carrier piston (2) is made with a narrowing in order not to prevent the exit (flow) of jet streams from the engines (5) and to reduce the thermal impact of jets on the support, as well as to form a larger area under the base of the carrier piston (2) to convert the pressure of gases formed under it into a buoyant force for acceleration.

The single (solid) unmovable (stationary) launch barrel (3) in this scheme is divided into two parts, upper and lower, between which the drive (21) of the pushing support (16) is placed. A crosspiece (25) firmly connects the upper and lower parts of the barrel (3) to ensure that it is monolithic. Of course, at the point of separation, the barrel (3) has a movable sealing connection (26) to prevent the gas from bursting out of the volume (6). There are also guiding elements between the outer wall of the pushing support (16) and the inner wall of the barrel (3), ensuring their concentricity and alignment with respect to movement (all of these are, in principle, secondary design tasks, so they are not included in the drawing).

In this scheme, the pushing support (16), as in the previous scheme, is moved upwards by means of: its reaction engines (5.2) located in the piston (16.2); exhaust gases from the operation of these engines accumulated in the volume (20); gases from gunpowder charges (7) from the bottom and the walls of the barrel; drive action (21). Engine thrust (5) and their exhaust gases accumulated in the volume (6), will move up not only the piston (2), but also pull up the support (16), as they are interconnected.

Gunpowder gas-releasing charges (7) are also intended to be detonated from the upper narrowed part of the pushing support (16) into the volume (6) under the carrier piston (2) into the area closest to the piston (2), where the action of the resulting gases is more effective for acceleration of the connected carrier piston—pushing support, and which will also reduce the inefficient dispersal of gases along the length of the extended gap between the support (16) and the barrel (3).

A small gap between the inner wall of the barrel (3) and the outer wall of the pushing support (16) below its narrowing and to the upper sealing (26) will be also filling up, with delay, by exhaust and gunpowder gases, which will improve their relative centering and concentricity and facilitate the movement of the support (16) without contact friction with the barrel walls (3). Gases under pressure in the gap will seem to press the support (16) from the barrel walls (3)

(For information: Of course, the upper part of the pushing support (16) will have powder charge locations (7) and thermal insulation against the thermal effects of jet streams (5). Permissible pre-heating of gunpowder will even be useful).

The internal volume (19) of the pushing support (16) can be filled with helium—light lifting inert gas, which will lower weight of the support, facilitate its acceleration and braking (light gas in the shell, submerged in denser and heavier gas will be pushed up from it according to the Law of Archimedes for gases and liquids, our case is similar—for information).

Everything else in this scheme—preparation, start, acceleration, departure of the object, braking of the acceleration system elements, discharge of gases, etc. will be carried out, as in the previous schemes, for the appropriate elements.

Such a pushing support (filled with helium, narrowing at the point of attachment to the piston and flowing gases from the outside) and such a launch barrel (divided by a joint into two parts) may be also used for the advancement of the booster piston in the previous scheme in FIG. 3.

FIG. 5 shows the rocket launch scheme, in which simultaneously with the acceleration of the rocket in the launch barrel and the final mortar ejection of the rocket, the coordinated acceleration of the launch barrel itself in the direction of the rocket acceleration is simultaneously carried out. In this case, the pushing support is excluded from the scheme.

This will significantly increase the rocket's launch velocity from the launch barrel, which will be equal to the sum of the rocket's acceleration speeds in the barrel, the rocket's mortar ejection speed, and the launch barrel's acceleration speed, achieved before the rocket's detachment and before the start of the barrel's braking.

FIG. 5*a*. Describes the position and the features of the system before the launch, the main preparatory actions and the beginning of the launch.

The launch barrel (3) is located inside the unmovable (stationary) cylinder (27) with the possibility of moving along it. In the bottom and in the walls of the cylinder (27) there are elements (devices) (7.1) for detonation (activation) of the gunpowder charges. At the base inside the cylinder (27) there is a spring (4.1) for moving and cushioning (shock-absorber) of the launch barrel (3). There are valves (10.1) in the cylinder (27) base and walls to relieve gas pressure from the volume (28) between the bases of the launch barrel (3) and the cylinder (27). The upper part of the cylinder (27) has a spring (13.1) and brakes (12.4) to stop the launch barrel (3) at the end of its acceleration upwards. There are also brakes (12.5) which, together with the brakes (12.4), can be used for emergency braking of the launch barrel (3) and for enhancing the braking in the normal corresponding mode.

There is a spring (13.3) outside the cylinder (27) in its lower part for stopping the barrel (3) with the help of the counterweight of the cylinder (27). In this case, a small fixed displacement of the cylinder (27) along the brake axis by the spring (13.3) compression length is planned.

The movable launch barrel (3) in this scheme (unlike the previous schemes where the barrel was stationary) has an electromechanical adjustable drive (21.1) for movement and acceleration of the launch barrel (3), external reaction engines (5.3) for the acceleration of the launch barrel (3), the jet braking elements (11.3) of the launch barrel (3) located outside the upper part of the launch barrel (3) (see FIG. 5b). (There is enough room around the large perimeter of the upper part of the barrel (3) for the even distribution of both acceleration reaction engines (5.3) and jet braking elements (11.3) (see FIG. 5b).

The base (bottom) of the launch barrel (3) is made in the form of a piston (29), which in turn has: reaction engines (5.4), elements for activation of the powder charges (7) in the volume (15) under the booster piston (14), elements of friction (12.6) and jet (11.4) (see FIG. 5b) braking, stoppers (30) for stopping against the brake springs (13.1) when the bottom barrel (3) reaches the top of the cylinder (27), axial channel (17.2) and the valve (10) for relieving the gas pressure from the volume (15) under the booster piston (if the pressure in the volume (15) is greater than in the volume (28)) into the volume (28).

And, of course, the launch barrel (3), as in the earlier variants, has in this example carrying (2) and booster pistons (14) with the corresponding elements, valves (10) for gas discharge etc., in short the barrel can be any of the earlier described variants of the schemes FIGS. 1-4.

(Sealing elements that provide non-bursting (escape) flow of gases from under the piston (29) upwards into the gap between the inner wall of the cylinder (27) and the outer wall of the launch barrel (3) and from this gap between them through the top of the cylinder (27) outward are not shown for clarity. Sealing elements of all pistons in general are not shown, as they are part of any pressure piston. By the way, a slight controlled gas burst into this gap will be even useful, because it will compensate for the pressure differential inside and outside the barrel, press the barrel from the cylinder walls, which will improve their centering and facilitate the movement of the barrel, as mentioned earlier. Dispersion of multiple sealing and simultaneously tightening elements along the length of the barrel will prevent completely the gas from bursting up (escape) outside along the gap and will also prevent possible barrel formation (bulge) of the barrel under the pressure from the inside. It is quite possible that at a high rate of extension of the barrel, the pressurized gases from under the piston base of the barrel will simply not have time to spread up in the gap (which also flies away from them) and will not come out through the top of the cylinder, and then only the tightening rings fixing the shape of the barrel and the guiding rings combined with them will be needed. Also, the extensions and guiding elements (external and internal) fixing and ensuring linearity of extension of the launch barrel, etc., are not shown for clarity being secondary design elements).

The fixed cylinder (27) can be positioned vertically or with an inclination in the mine or on the corresponding terrain. Correspondingly, the launch barrel (3) accelerated in it can move out of the cylinder (27) vertically or with an inclination.

The carrier piston (2) with rocket (1) and booster piston (14) still have the ability to move along the barrel (3) acted upon by the corresponding operating forces. Gunpowder charges may also in principle be activated from the walls of the barrel (3) to the volume (15) under the booster piston (14) as it moves. This possibility is not shown in the scheme to simplify the explanation of the main thing in the picture—acceleration of the launch barrel (3) simultaneously with the acceleration of the rocket (1) in the launch barrel (3).

Main preparatory actions before the launch:

Preparation of the elements inside the barrel for the launch and acceleration of the rocket in the barrel is carried out in the same way as in the previously described suitable variants.

Preparation of the system for launch barrel (3) acceleration is performed as follows. The barrel (3) is pushed down into the cylinder (27) with the help of the drives (21.1) until it is cocked by compression of the spring (4.1), the release of which will make it easier to move the barrel (3) upwards during the launch.

As a result, before the launch, all acceleration elements of the acceleration system are in the lower position inside the cylinder (27).

FIG. 5a. Launch. Reaction engines (5.4) of the piston base (29) of the launch barrel (3) are engaged. In coordination with the above, the spring (4.1) is released to be opened and the drive (21.1) and the external reaction engines (5.3) are engaged in order to move the launch barrel (3) upwards out of the cylinder (27). At that time, the bottom of the cylinder (27) will be the support surface for outgoing jet streams of engines (5.4) pushing against it, which at that moment will increase the initial movement of the launch barrel (3), in addition to (except) the jet propulsion and the pressure of the accumulating lifting exhaust gases.

In order to strengthen the movement and the acceleration of the launch barrel (3) upwards, gunpowder charges (7.1) are activated from the bottom (initially) and walls (afterwards) of the cylinder (27) into the volume (28) under the piston base (29) of the launch barrel (3) in the increasing dynamics of the movement and acceleration of the launch barrel (3) upwards.

The exhaust gases from the reaction engines (5.4) and gases made by the activation of the gunpower charges (7.1) will accumulate in a closed volume (28) and by their pressure (converted into a huge lifting force due to the large area of the piston base (29) of the barrel (3)), together with other (previously mentioned) forces, contribute to the advancement and the acceleration of the launch barrel (3) in the cylinder (27) (Similar to the movement of the pushing support in FIGS. 3,4)

The sequential activation of the gunpowder charges (7.1) in the increasing dynamics in the immediately opening zone (volume) under the base of the moving piston (29) will increase their force directly in the effective acceleration zone under the piston and only after that their pressure will spread out with fading down and in the increasing volume (28), which is already of less interest to us. (It is clear that this feature also applies to all other pistons of the system under which the charges are activated).

And of course, during the launch and acceleration of the barrel (3), a coordinated launch into motion and acceleration of the carrier piston (2) with a rocket (1) and a booster piston (14) inside the launch barrel (3) is carried out, for example, as in the scheme for FIG. 2.

The acceleration and moving out parameters are calculated in such a way that when the carrier piston (2) reaches the top of the launch barrel (3), the lower part of the launch barrel (3) also reaches the top of the cylinder (27) (of course, taking into account the braking distance for pistons and the barrel), and then begins the stage of rocket (1) detachment from the carrier piston (2), braking of elements intended for acceleration inside the launch barrel (3) and braking of launch barrel (3) movement out of the cylinder (27).

The ability to easily change the force and the speed of the upward movement of the barrel (3), due to its controlled drive (21.1), makes it easy to achieve coordinated acceleration, apart from many other options for adjusting the acceleration parameters.

FIG. 5*b*. Detachment and departure of the rocket and braking of the acceleration system elements.

Mortar detachment of the rocket (1) from the carrier piston (2) and braking of the corresponding elements inside the launch barrel (3) is performed as described for FIGS. 1*c*, 2*c*, and 3*c* (without pushing support).

The launch barrel (3) is braked as follows: Reaction engines (5.4), drives (21.1), activation of gunpowder charges (7.1) are stopped, valves (10.1) of the cylinder (27) are opened to relieve gas pressure from the volume (28), friction (12.4) (at the top of the cylinder), (12.5) (in case of suitable mode) and (12.6) (bottom of barrel) and jet (11.3) (top of barrel) and (11.4) (bottom of barrel) braking of the launch barrel (3) are activated and at the suitable stage of braking, the braking reverse of the drive (21.1) is activated. In case of continued slow movement of the barrel (3), it will still be stopped by the spring (13.1) (in the upper part of the cylinder (27) resting on the stopper (30) (in the lower part of the launch barrel) and by adding to the braking process the large counter-mass of the cylinder (27) through the spring (13.3) at its bottom.

(Regarding the above appropriate mode of operation: At a high speed of acceleration of the launch barrel (3) and therefore the long way of its braking, the brakes (12.5), located appropriately along the cylinder (27) can be used)

When the bottom of the launch barrel (3) reaches the top of the cylinder (27), the carrier piston (2) with the rocket (1) it also reaches the top of the barrel (3) in the coordinated mode with the acceleration of the barrel (3) and taking into account the braking distance of the barrel (3) and the elements inside the barrel (3). Then the rocket (1) is detached from the carrier piston (2) by means of mortar launch before the beginning of the acceleration speed drop of the carrier piston (2) and the barrel (3) from their braking.

After the rocket (1) has departed and braked, the elements of the launch system return to their initial or preparatory positions.

This launch scheme has increased speed capabilities due to simultaneous acceleration of the object (rocket) in several systems accelerating into each other, which provides (forms) the speed of departure of the object from the barrel equal to the sum of speeds from each system, which, in this example, is the sum of the rocket (1) acceleration speed on the carrier piston (2) achieved before the mortar detachment of the rocket (1) from the carrier piston (2) and its braking, plus the mortar detachment speed and plus the acceleration speed of the launch barrel (3) before the start of its braking.

FIG. 6, presents a simplified scheme of launching the rocket by means of a three-section telescopic launch barrel (without acceleration of the rocket inside the barrel), accelerated by the action of pushing-out force of water and bottom reaction engines of the external section of the barrel with accelerated extension of the internal section (due to the polyspast connection of sections), the upper part of which contains the rocket that is detached from the barrel in the form of a mortar launch at the end of acceleration, pushing-out and opening of sections of the barrel prior to their braking.

FIG. 6*a* shows the initial position of the system before the launch after the barrel has been pressed into the water.

In this simplified scheme, in order to facilitate the principle of opening and extending (pushing out) of the launch barrel from the water, the elements of pressing the barrel into the water, the elements ensuring the linearity of the barrel immersion into the water and extension of the barrel out of the water, guiding and fixing elements (as secondary elements), elements of friction and jet braking of the elements, etc. are not shown (they will be shown in the following scheme).

The telescopic launch barrel consisting in this example of 3 (three) sections—external (3.1), middle (3.2), and internal (3.3)—in the folded state before the launch is submerged (pressed)—into the sea (31) to the required depth and fixed in such position before the launch.

The rocket (1) is located inside the upper part of the inner section (3.3) of the launch barrel. The outer section (3.1) is made in the form of a cylinder with a sealed bottom and has reaction engines (5.5) in its base. Sections of the telescopic barrel are located one in the other and are connected to each other in a polyspast manner (connection) for relative movement. The cables (32) of the polyspast connection are fixed at the bottom of each corresponding inner section and through rotating (spring loaded and other) blocks (33) at the top of the corresponding section, fixed from outside to the bases (34) (with shock-absorbing which prevents the abrupt tension of the cables).

FIG. 6*b*. Launch of the telescopic barrel into moving out (pushing out from water) and acceleration with opening of the barrel section.

During the launch, the outer section (3.1), which absorbs the pushing-out force of water, is released (released from the fixation) and the bottom reaction engines (5.5) of this section are started. The huge pushing-out force of the water (according to Archimedes' Law) equals to the weight of the fluid in the displaced section (3.1), together with the jet thrust of the engines (5.5), pushes the section (3.1) upwards for the acceleration.

At the same time, due to the polyspast connection of the sections, there is an accelerated (almost 2 times) movement out of each subsequent inner section in relation to the nearest outer section (the term "almost" is conditioned by the difference in diameters of the telescopic barrel sections, which affects the length of movement).

(For information: having measured the lengths of sections (3.1), (3.2), (3.3), length of cables (32) and length of moving out of sections, we can become convinced that at invariable length of elements (sections and cables on all the pictures in scale 1:1500) lifting/pushing-out of water of external leading section (3.1) to 500 meters, will lead to lifting-pulling out of water by cables of middle section (3.2) to ~1000 m, and the inner section (3.3) with the rocket (1) to 2000 m. in the same period of time. This actually proves (confirms) that when the barrel sections are opened and extended, each subsequent inner section increases the extension speed by a factor of almost 2 compared to the nearest outer section. At the same time, according to the law of conservation of the energy, with the decrease in the pushing-out force of water, as the external section (3.1) rise, the carrying ability (lifting force) of the inner section (3.3) will diminish with the increase of its extension speed, which will be taken into account and explained in mom detail in the following calculation of the possible variants of the launch system implementation).

This means that when the outer leading section (3.1) is pushed out and accelerated at the speed of ~100 m/s (which, as explained earlier, is quite realistic), the middle section (3.2) will extend at the speed of ~200 m/s, and the inner section (3.3) with the rocket (1) at the speed of ~400 m/s.

FIG. 6c. Mortar detachment of the rocket at the end of the acceleration and the extension of telescopic launch barrel sections.

During the end of the inner section (3.3) extension, a moment before the beginning of the sections braking (in order to avoid a drop in the speed of preliminary acceleration of the rocket), a mortar launch/ejection/detachment (23), (18) of the rocket (1) from the top of the section (3.3) is carried out (by analogy with described in FIG. 3c, only with the difference that the detachment of the rocket (1) will occur not from the carrier piston, which is not present in this scheme, but from the top of the section (3.3), the engines (5.5) are turned off and braking of the telescopic sections of the barrel is carried out. The recoil from the mortar detachment of the rocket (1) will help braking the sections of the launch barrel.

The rocket's (1) velocity of departure from the section (3.3) will already be equal to the sum of the maximum acceleration velocity of the sections (3.3) and the rocket's (1) mortar detachment velocity. At a section (3.3) speed of ~400 m/s and a mortar speed of ~500 m/s, the rocket's (1) departure speed will be 400+500≈900 m/s.

This scheme will make it possible to launch an object of a huge mass with the speed of a bullet, a projectile without significant energy consumption for acceleration, since during the period of actual acceleration a huge free releasing and pushing-out force of water is mainly used. The energy required to press the barrel into the water will be spent before the launch and before the actual acceleration. The barrel can be pressed into the water slowly and for a long time, which does not require a huge one-time power.

In principle, a single-cylinder (not telescopic) barrel can be used for acceleration out of water, which will allow to accelerate an object of huge mass up to a speed of about ~100 m/s (without mortar detachment) or up to a speed of ~600 m/s with mortar detachment. In this case, the barrel can be much shorter, and the scheme is much simpler.

If, instead of fixed fastening of cables (32) to the bases (34), the cables (32) are wound with advance and force on the drive drums and the opening and extension of the sections will also be enhanced by additional jet thrust and compressed gases (which compensate for the decrease in load capacity with increasing speed (as high-speed polyspast was used, the speed increases and the force decreases) and compensate for the decrease of the pushing-out force as the barrel is pushed out of water)), then the internal section (3.3) speed of extension and its payload capacity with the rocket (1) will increase even more, which at the simultaneous acceleration of the rocket (1) inside the section (3.3) will allow to accelerate even more (up to higher speed) even a heavier rocket (acceleration of the rocket inside the barrel provides additional payload capacity and speed, about which it has already been written earlier), which will be offered in the following scheme (FIG. 7).

FIG. 7 shows the scheme of launching the rocket with its acceleration inside the inner section of the telescopic launch barrel, which also opens and accelerates simultaneously with the use of the pushing-out force of water, additional jet powers, gases under pressure and drives with the location of everything on a floating sea platform.

FIG. 7a. shows additional elements and features that enhance acceleration (relative to the previous scheme), preparation of the barrel for launch and beginning of the launch.

In this scheme, the rocket (1) is placed in the lower part of the inner section (3.3) on the carrier piston (2), below which, the booster piston (14) is located before the launch.

These pistons are, of course, equipped with reaction engines, etc., as in the previous schemes (the positions are not specified so as not to obstruct the picture).

The inner sections (3.3) and (3.2) of the telescopic launch barrel have piston bases (29.1), (29.2) with reaction engines (5.6), (5.7), below which the corresponding booster pistons (14.1) and (14.2) with reaction engines (5.8) and (5.9) are located.

The base of the outer section (3.1), other than the reaction engines (5.5), shall be equipped with devices out of which gunpowder charges (7.2) are activated inside the volume of this section under the booster piston (14.2), forming gases under pressure to strengthen the boost.

Springs between the elements, which increase the initial movement and prevent collision among the elements, brake springs at the top part of the sections, possible activation of gunpower powder charges in the volumes between the pistons for increasing the acceleration (everything that is possible as in the previous schemes), sealing elements that ensure the gas containment, barrel guiding and fixing elements, tension cables, etc. are not shown for clarity (so as not to obstruct the images with the previously described and secondary elements of design).

Only the main braking spring (4.2) of the leading outer section (3.1) of the barrel and the activation of gunpowder charges (7.2) from the base of the section (3.1) are shown.

All sections of the telescopic barrel also have reaction engines (5.10) on the outside in their upper part to accelerate the sections and jet braking elements (11.5) of the sections, which are evenly distributed along the perimeter of the sections.

The outer leading section (3.1) of the barrel has a contact electromechanical adjustable (by force, speed and direction) drive (21.2) and an adjustable drive (21.3), which transmits the acceleration lifting force for this section (3.1) via cables (32.1) (fixed to the bottom of the section).

The cables (32) of the polyspast system are attached to the appropriate drive drums (35) (adjustable by force, speed and direction) which strengthen and accelerate the extension of the sections (3.2) and (3.3).

All pistons (2), (14), (14.1), (14.2), (29.1), (29.2) have appropriate elements of jet braking (11), (11.1), (11.6) and friction braking (12), (12.1), (12.7).

The outer section (3.1) has friction (12.8) and spring (4.2) braking, which is supported during action on the huge counterweight of the floating platform (36).

All this stuff (equipment) is located on a floating sea platform (36) in the sea (31).

This scheme (in accordance with paragraph 20 of the formula allowing various exceptions) may not contain booster pistons (14.1) and (14.2) under the piston bases of internal sections, which will reduce the gas support in the volumes, but on the other hand, will simplify the scheme and so on.

As in the previous scheme, the telescopic launch barrel consisting of sections (3.1), (3.2), (3.3) in the folded state before launch is submerged (pressed) into the sea water (31) at the calculated depth and fixed in such a position before the start. Drives (21.2) and friction brake (12.8) (after the pressing) are used to press the barrel into the water and keep the barrel in the water (except for the rods not specified for this gap as secondary elements).

Launch. During the launch, the external section (3.1), which absorbs the pushing-out force of water, is released from the fixation by disconnecting (releasing) the brake (12.8) and the position of "holding" of the drive (21.2) (except for the participation of rods). The pushing-out force of the water starts to push out the outer section (3.1) of the barrel, and due to the polyspast connection of the telescopic barrel sections, begins the accelerated extension of the inner sections.

For acceleration and enhancement of the extension and opening up of the barrel sections, reaction engines (5.5), drives (21.2) and (21.3) of the outer section (3.1), drives (35) of inner sections are activated and they start winding on their drums the cables (32) of the polyspast system, reaction engines (5.6) and (5.7) of piston bases (29.1) and (29.2) of sections (3.3) and (3.2) respectively are activated. As a result, under the piston bases (29.1) and (29.2) begins to accumulate the exhaust gas from their engines (5.6) and (5.7), and then comes the moment of activation of the reaction engines (5.8) and (5.9) of the booster pistons (14.1) and (14.2) for boosting (compressing) these exhaust gases.

The exhaust gases from the engines (5.9) accumulating in volume under the booster piston (14.2) create a lifting damping cushion of the compressed gases and then comes the moment of activating the gunpowder charges (7.2) from the base of the section (3.1) emitting gunpowder gas into the volume under the piston (14.2).

External reaction engines (5.10) of the sections (3.1), (3.2) and (3.3) are activated and they also accelerate and enhance the extension of the sections.

Exhaust and powder gases accumulating in closed volumes under the pistons create a huge lifting force that increases the payload capacity and acceleration rate of the internal sections of the barrel.

Uniform cable tension (32) and (32.1) around the perimeter of the sections and the pulling effect of the reaction engines (5.10), in addition to increasing acceleration, also contribute to the vertical stabilization and stability of the sections during their extension (except for possible use of other design elements for vertical stabilization of the barrel).

Simultaneously with the extension and acceleration of the telescopic launch barrel sections, the acceleration of the rocket (1) on the carrier piston (2) is carried out in a coordinated manner, using the booster piston (14) inside the inner section (3.3) accelerated in the same direction (as in the scheme already described for FIGS. 2 and 5), in such a way that when the telescopic barrel is about to be opened and accelerated, the carrier piston (2) with the rocket (1) approaches to the top of the section (3.3) of the launch barrel and then comes the moment when the rocket (1) is detached from the carrier piston (2), the rocket (1) leaves the section (3.3) and the braking elements of the acceleration system are activated.

At the same time (as the calculation and the experiment show) the free, for the period of direct acceleration, pushing-out force of water and the lifting force of free exhaust gases are the predominant forces for acceleration of the object (rocket) of huge mass according to this scheme of launch, despite the presence of a large, but already costly, additional lifting and accelerating energy.

Regulation of the acceleration mode is carried out, in the same manner as in the schemes described earlier, by means of controlled drives, changes in gas pressure, etc.

FIG. 7b. Departure of a rocket from the barrel, braking of acceleration system elements and return of the system for preparation of the next launch or relocation.

In the stage (in the period) of completion of extension (opening) of sections (3.1), (3.2), (3.3) of telescopic launch barrel, with simultaneous reaching of the upper part of the section (3.3) by the rocket (1) on the carrier piston (2), a moment before the start of the acceleration system elements braking, a mortar launch—detachment—ejection of the rocket (1) from the section (3.3) from the carrier piston (2) is carried out (everything is similar to the one described above for FIG. 3c) and immediately the braking of the acceleration system elements is begun.

For this purpose all the sources of accelerating energy are switched off (except, of course, for the pushing-out force of water, which cannot be switched off, but it is possible to brake and stop)—the operation (action) of all the accelerating reaction engines of the elements of the system and the activation of gun-powder gas-releasing charges (which have been previously specified) are stopped, the accelerating action of the drives (21.2), (21.3), (35) is switched off and their braking is activated, the valves (10) and (10.2) for relieving the pressure of (gun-power exhaust) gases from the volumes under the pistons (2), (14), (29.1), (29.2), (14.2) (the valve for relieving the pressure of gases from the volume under the piston (14.2) is not shown for clarity) are opened, friction (12), (12.1), (12.7), (12.8) and jet (11), (11.1), (11.5), (11.6) braking of pistons and telescopic barrel sections, spring braking and cushioning of all the acceleration elements are activated (as already mentioned, the springs between the pistons are not shown, only the most powerful braking and cushioning spring (4.2) of the outer section (3.1) is shown, which uses the entire counter mass of the floating launch platform (36) to brake and stop the main barrel lifting force (pushing-out force of water acting on section (3.1)).

In this case, the mortar detachment of the rocket (1), in addition to the final acceleration of the rocket (1) at the end of acceleration, will also create a braking response—a reaction to brake the carrier piston (2) (as in the scheme FIG. 3c) and also for braking the sections of the barrel (when the brake friction couplings of the pistons are switched on, the brake impulse will be transmitted to all sections of the launch barrel).

When the gas pressure is relieved from the volumes and the lifting forces cease their action, the barrel sections and pistons under their own weight will start to descend smoothly into a compact folded state for preparation of the next launch or relocation, and it is possible to brake by using the friction couplings and tightening the drive cables. When the friction couplings are activated and the engines are fixed, and also when part of the gas pressure is kept in the volumes under the pistons in sections (3.1) and (3.2), the barrel may remain in the open state (position) if required. Also after the launch, the barrel can be lifted out of the depths of the sea in a compact folded state (position) and mounted horizontally on a floating launch platform for sailing to the base or for relocation. The platform made of several sliding parts for the launch period. (These are all accompanying, secondary design tasks, and therefore are not specified).

This launch scheme has the lowest specific energy consumption (for acceleration of the mass unit of the object launched), because during the launch, there is use of the dominant free (during the period of actual launch) huge energy of the pushing-out force of water and the energy of the free exhaust gases.

FIG. 8 shows the scheme of launching a rocket on a carrier piston in a curvilinear curving launch barrel with the use of Earth's gravity compressed gases and jet thrust with mortar detachment of the rocket from the carrier piston at the end of the acceleration in the barrel, the effect of which will be described below.

FIG. 5a. Preparing for launch, some design features and the beginning of the launch.

The launch barrel (3) in this scheme has a curved configuration, which moves smoothly from a short straight horizontal (or slightly inclined towards the direction of movement) section to a long, downwards direction and then upwards, which allows to use the Earth's gravity force for acceleration of the object at the initial stage of its acceleration (the section of the barrel directed downwards) (in case of the amplified fall of the object—rocket downwards) instead of the energy expenditure for overcoming it, as it happens at the usual known launches of heavy rockets upwards.

(With conventional known launches of heavy rockets, the initial acceleration phase upwards, with overcoming the Earth's gravitational force, is the most energy-intensive and tense (important) one. In the proposed scheme, these energy expenditures will be excluded, and the Earth's gravitational force, on the contrary, will be used for acceleration as a huge free energy).

At the mounting initial horizontal section of the launch barrel (3) from the driveway (it is not shown for clarity), putting in (insertion) into the barrel (3) of the carrier piston (2) with a fixed in it rocket (1) is carried out. Deep positioning, installation of the rocket (1) into the volume of the carrier piston (2) will ensure reliable fixation of the rocket (1) while passing through the sections of the barrel (3) with a bend.

The sliding out stoppers (37) secure the carrier piston (2) with the rocket (1) preventing the accidental forward and downward movement before the start.

Next, the separating spring (4), booster piston (14) and flexible pushing support (16.3) attached to the booster piston (14) are inserted into the barrel (3). The separation spring (4) prevents the pistons from colliding and can facilitate the piston's (2) movement during compression and can be attached to the piston (14).

The pushing support (16.3) which is wound up on its drive drum (38) prior to the launch and fixed in the cassette (39) for preventing the bulging out of the support coils (16.3) in the process of moving the support (16.3) into the barrel (3).

In the process of moving the pushing support (16.3) into the barrel (3), the drive drum (38) moves along its axis, which ensures the coaxial alignment and stability of the coils unwinding down and the insertion of the support coils (16.3) into the barrel (3). The support (16.3) enters the bottom of the barrel (3) in a manner ensuring the hermetic tightness and mobility of the connection. Part of the pushing support (16.3) in the fastening to the piston (14) area is made with narrowing and with the connection providing the possibility of rotation of the piston (14). The internal volume of the support (16.3) and the free volumes of pistons (2) and (14) are filled with helium, which (as in the previous example for FIG. 4) will facilitate their movement during acceleration and will reduce inertia to facilitate their braking.

It is also possible to place the flexible pushing support (16.3) in the fixing chute (40) inclined in the direction of its insertion into the barrel (3) from which it is inserted into the barrel (3) by means of external controlled drives (21)(FIG. 8b).

It is considered possible that the flexible pushing support (16.3) can move the carrier piston (2) directly (as in the example in FIG. 4), then the booster piston (14) is excluded from the scheme.

The hollow pushing support, both flexible (FIG. 8) and inflexible (FIGS. 3 and 4), provides for the presence of (may have) elements that prevent (exclude) its collapsing inward or bulging outward. For example, the inclusion in the structure of the walls of the flexible pushing support (16.3) of the elastic extended spiral (similar to one used for cleaning of pipes) will ensure its stability of form in diameter being both flexible and rigid for force transmission. The coaxial barrel (3) and support (16.3) have a comparable (commensurable) diameter and a small gap between them, which also secures the support (16.3) inside the barrel (3) and eliminates the critical bending of the support under load.

The design includes guiding elements along the length of the gap (between the outer wall of the support (16.3) and the inner wall of the barrel (3)), which prevent the axial twisting of the flexible pushing support (16.3) in the process of its advancement inside the curved barrel (3) and ensure the constancy (uniformity) of the gap for the better advancement of the support (16.3) inside the barrel (3) (All these and other are secondary tasks, which will be resolved in the process of a specific design).

The design also includes activation of gas-releasing gunpowder charges (7) into the volume of the gap under the booster piston (14) and into the volume between the pistons (2) and (14) as they move in the barrel (3) in order to increase their acceleration.

The design also includes mortar detachment of the rocket (1) from the carrier piston (2) in the end of the acceleration in the barrel (3).

As in the examples described earlier, at the end of acceleration, the use of friction jet braking (11), (11.1), friction braking (12), (12.1) and spring (13) braking elements, stopping of drives, release of gas pressure and the effect of recoil (rollback) from the rocket's mortar detachment for braking the elements of the acceleration system and return of the system to its original position are provided.

The curved launch barrel (3) and the inclined chute (40) can be installed (mounted) using suitable terrain topography.

Launch (start). The stoppers (37) holding the piston (2) are released, the reaction engines (5) and (5.1) of the pistons (2) and (14) and the drive drum (38) advancing the pushing support (16.3) into the barrel (3) are activated.

Due to the action of the accumulated and compressed exhaust gases, jet thrust and pushing support (16.3) force (in the dynamics previously described for the examples in FIGS. 2 and 4), the carrier piston (2) with the rocket (1), through a smooth bend, is directed into the increasing acceleration fall down inside the barrel (3).

Moreover, due to the amplification of the fall by the jet thrust, gas pressure and the increasing velocity of the support movement (16.3), the speed of the rocket (1) acceleration in the part of the barrel (3) directed downward, will significantly exceed the speed of the simple (non-amplified) free fall acceleration caused by the Earth's gravitational force, which is efficiently used for acceleration.

(During the amplified fall, even a transition through the weightlessness will occur, and during this period, with the greatest degree of realization, the velocity impulse, the effect of the rocket thrust, will appear. In a state of falling and "weightlessness" of the object, it can be accelerated with less energy consumption even at the subsequent acceleration upwards).

Then the acceleration continues, considering the smooth bending of the barrel (3), upwards with much less energy expenditure (than without amplified fall when the acceleration goes from below upwards, and moreover so during the known vertical rocket launches).

For even greater acceleration, gunpowder gases (7) are also used in the gap under the booster piston (14) and in the volume between the pistons (2) and (14) as they move.

FIG. 8b. In the variant when the pushing support (16.3) is positioned in the chute (40), the pushing support (16.3) is moved into the barrel (3) by means of external drives (21) evenly arranged around the perimeter of the support up to the entrance.

FIG. 8*c*: Departure of the rocket from the launch barrel, braking of the acceleration system elements and return to the starting position.

As in the examples above, when the rocket (1) reaches the top of the barrel (3), the rocket (1) is released from the carrier piston (2) by a mortar detachment and is ejected out of the barrel (3); the drive (38) or (21) of the support (16.3) is switched off, the acceleration engines (5) and (5.1), pistons (2) and (14) are stopped, the activation of the gunpowder charges (7) is stopped, the valves (10) for relieving gas pressure are opened, jet (11) and (11.1), and friction (12) and (12.1), and spring (13) braking are activated.

The rocket (1) with the support frame (18) leaves the barrel (3), the support frame separates, and the rocket turns on its reaction engines (immediately or later) to continue acceleration and flight.

The return of the pistons to their original position after the rocket departure and the braking of the system elements is carried out by winding the support (16.3) onto the drum (38) or by reversing the drives (21) and by pumping air into the volume above the pistons.

FIG. 9 presents several variants for detachment and departure of the rocket from the launch barrel using a protective cocoon (41) around the rocket.

FIG. 9*a* shows the variant when the protective cocoon (41) with the rocket (1) in it and the carrier piston (2) depart from the barrel (3).

At a high acceleration velocity and a correspondingly long rocket (1) passage path inside the barrel (3) after the detachment from the carrier piston (2) inside the barrel (3), there is a need for a protective cocoon (41) around the rocket (1), which will eliminate the dangerous contact of the rocket (1) with the walls of the barrel (3).

The departure of the carrier piston (2) from the barrel (3) also becomes advisable. It excludes the length of the braking distance for stopping the carrier piston (2) from the total length of the barrel (3) and accordingly makes the barrel (3) shorter by the length of the excluded braking distance. Technologically, only a small braking distance is required for the outbound carrier piston (2), as explained below.

Separation of the cocoon (41) from the piston (2) inside the barrel (3) will be safer, coaxial and linearly fixed by the guiding walls of the barrel (3) than separation from the already departed, loose piston. Therefore, the piston (2) will begin to brake before it leaves the barrel (3) (This will require a much smaller braking distance than if the piston (2) is completely stopped in the barrel (3)), and before it is braked, the cocoon (41) will be separated from it, so as not to reduce the speed of the previous acceleration of the cocoon (41) with the rocket (1) in the barrel (3).

The protective cocoon (41) with the rocket (1) will begin to separate from the carrier piston (2) in the process of activation of the friction (12) and jet (11) braking of the carrier piston (2) In this case the ejection effect of the jet braking streams (11) and the support by the resulting exhaust gases under the base of the cocoon (41) will contribute to the separation of the cocoon (41) with additional acceleration and lifting force. The support reaction of the braking jets streams (11) from the cocoon (41) (insignificant mass) with the rocket's (1) (huge mass) will contribute to the braking of the piston (2), so that it does not fly far after the departure and does not interfere with the departure of the cocoon (41). The base of the cocoon (41) will protect the rocket (1) from the effects of jet braking streams (11), and the spiral-shaped (inclined) ribs (edges) (42) of the cocoon (41) will create axial rotation of the cocoon (41), which contributes to the straight line of its departure and further rectilinear flight of the rocket (1) with stabilizing rotation after its detachment from the cocoon (41) after leaving the barrel (3). The cocoon (41), after its departure from the barrel (3), can be separated from the rocket (1) as the support frame from the sub-caliber projectile.

After the cocoon (41) has been detached and the carrier piston (2) has been ejected, their safe landing on land or on water is provided for.

FIG. 9*b* shows a variant when a protective cocoon (41) with a rocket (1) in it flies out of the launch barrel (3), and the carrier piston (2) is braked and remains in the launch barrel (3).

When the carrier piston (2) approaches the top of the launch barrel (3) (taking into account the length of the barrel necessary for braking the carrier piston (2)), realize mortar detachment (23) the cocoon (41) with the rocket (1) in it from the carrier piston (2) and the jet (11) and friction (12) braking of the carrier piston (2) are activated. Mortar detachment and jet braking directed under the cocoon (41) base will further accelerate the cocoon (41) and increase its ejection and create a braking effect to stop the piston (2).

Mortar detachment force and jet braking will be transmitted to the cocoon (41) through a protective, peak load damping support frame (18.1), which will also protect the cocoon reaction engines (5.11), which will be activated after the separation of the cocoon (41) from the piston (2) for strengthening and maintaining the acceleration of the cocoon (41) with the rocket (1) in the barrel (3) and preventing the formation of a braking vacuum behind the moving cocoon (41).

The cocoon (41) is located in a light cup (43), which has holes for escape of jet streams of the engines (5.11) and which, when reaching the top of the barrel (3) can rest against the brake spring (31.2), stops and stays in the barrel (3), and the cocoon (41) with the rocket (1) leaves the cup (41) and departs the barrel (3). The support frame (18.1) and the carrier piston (2) can also sequentially rest against the spring (13.1).

Jet streams and gases from the engines (5.11) will also contribute to the separation of the cup (43) from the cocoon (41) and to braking of the cup (43) and support frame (18.1). If necessary, the cup (43) and support frame (18.1) may also have friction braking elements (not shown for clarity) and the pressure of the gases from under the support frame (18.1) may be relieved through the opening valves (10).

After leaving the launch barrel (3) or at the barrel's edge, the cocoon (41) is separated from the rocket (1), its reaction engines (5.11) action stops and the rocket (1) soars into flight, and then as before.

FIG. 9*c* shows a variant where the protective cocoon (41) and the carrier piston (2) remain in the barrel (3) and the rocket (1) departs the barrel (3).

In the period preceding the completion of the acceleration of the carrier piston (2) in the launch barrel (3), the mortar detachment (23) of the cocoon (41) from the carrier piston (2) is carried out and the jet (11) and friction (12) braking of the carrier piston (2), which lags behind the cocoon (41), slows down and stops in the upper part of the barrel (3), and the valves (10) of the gas release are also opened.

In turn, the cocoon (41) flying in the barrel (3) with the rocket (1) in it, approaching the upper part of the barrel (3), activates its jet (11.7) and friction (12.9) braking and at the end of braking rests against the brake spring (13.2) and stops in the barrel (3). (Elastic, cellular, gas-filled, for e.g. helium cocoon (41) will have low specific mass and inertia and therefore will easily brake and stop). The rocket (1) flies out by inertia from the cocoon (41) which started to brake and then switches on its reaction engines to continue acceleration and flight.

In this case, the rocket (1) engines are to be switched on during the braking period of the protective cocoon (41) or the rocket (1) is to be separated from the cocoon (41) by repeated mortar detachment (the first one was the mortar detachment of the cocoon with the rocket in it from the carrier piston), which will increase again the acceleration of the rocket (1) and create a useful recoil reaction for braking the protective cocoon (41) in the upper part of the barrel (3).

The launch cylinder (8) located at the top of the cocoon (41) protects the rocket (1) from the effects of the jet streams (11.7) of the cocoon jet braking (41) and stabilizes the departure of the said rocket from the said cocoon.

A spring (4.3) may be placed between the cocoon (41) and the carrier piston (2) for releasing the cocoon (41) from the piston (2) and preventing their colliding with each other during the period of their acceleration and braking.

Simplified, not Limited Examples of Calculation of Lifting Capabilities and Speed Capabilities of Some Launch Schemes for the Proposed Invention Some parameters of the Saturn V (USA) rocket are taken for calculation, such as:
The length of the rocket is 110.6 m.
The diameter of the rocket in the lower nozzle area is ~10 m.
The rocket's starting mass is ~2,913 tons.
Payload weight (payload) ~139 tons.

For the proposed launch schemes, the inner diameter of the launch barrel (3) and, accordingly, the diameter of the carrier (2) and booster (14) pistons, equal to 30 m Calculation of lifting capacities for the launch schemes shown in FIGS. 1-5.

FIG. 1. Let us calculate the lifting power of the exhaust gases from the reaction engines (5) of the carrier piston (2), which accumulate in the volume (6) under the carrier piston (2) at a gas pressure of 10 kg/cm2 (~bar, atm).

The lifting force equals to the piston area multiplied by the gas pressure under the piston.

The piston area (2), which receives the pressure, equals to $S=\pi \times R^2=3.14 \times 15^2=706.5$ m$^2$ 7,065,000 cm2, where R is the piston radius, then the lifting force will be 7,065,000×10=70,650,000 kg=70,650 tons.

This is 24.3 times larger than the starting mass of the Saturn V rocket (70,650:2,193=24.3), and it is at a pressure of only 10 atm. and without taking into account the jet thrust of the engines (5), which we will calculate further.

The lifting force of the reaction engines thrust of the carrier piston (2): the area of the Saturn V rocket nozzle part equals to $S_1=\pi \times R^2_1=3.14 \times 5^2=78.5$ m$^2$, where $R_1$ is the rocket radius in the lower nozzle part. This 78.5 m$^2$ nozzle part lifts by the rocket's jet thrust the mass of 2,193 tons, according to the rule of three the area of the piston (2) is 706.5 m$^2$ (and has similar reaction engines) can lift by the jet thrust 26,217 ton
78.5-2,913
706.5-X
X=(706.5×2,193): 78.5=26,217 tons
1 m$^2$ of nozzle part lifts 37.1 tons (2,913:78.5=37.1)

Thus, reaction engines (5) of the piston (2) lift 26,217 tons, and the lifting power of gases compressed up to 10 atm under the piston (2) will be 70,650 tons, which is 2.7 times more (70,650:26,217=2.7), at a pressure of 20 atm. 5.4 times more. Therefore, the lifting force of the gases will be dominant and will make the piston seemingly "weightless" and more easily accelerated by jet thrust.

The total lifting force of the compressed gases and piston jet force (2) will be 70,650+26,217=96,867 tons (at a gas pressure of 10 atm. under the carrier piston (2)). This force advances the carrier piston (2) with the rocket (1) on it in the barrel (3).

The force for lifting the rocket (1) only will be lower by the weight of the piston (2) with the fuel in it, which is ~6,000-7,000 tons. (According to the calculation for lifting the object to a height of 2-3 km—the length of the barrel, in proportion to the rocket Saturn V, with a known increase in weight of the piston (2) with fuel by 2 times, as the piston (2) must be sturdier than the stage of the rocket Saturn V and perform a number of other functions).

Let us subtract from the total lifting force (96,867 tons) the weight of the piston (2) with fuel and other things in it (6,000-7,000 tons) and get the lifting and acceleration force that is used for the rocket (1) advancement only:
96,867−(6,000-7,000)=90,000 tons (ninety thousand tons)
That is enough force to accelerate 30 Saturn V rockets (90,000:2,913≈30) in the barrel.

Thus, the mass of the rocket (1) accelerated in the barrel (3) may be ≈90,000 tons (at a pressure of only 10 atm. under the piston).

At 20 atm. pressure, the rocket's mass will be ≈161,000 tons, (70,650×2≈141,300; 141,300+26,217≈167,517; 167,517−(6,000-7,000)≈161,000 tons). That is 55 times the mass of the Saturn V rocket, (161,000:2,913≈55).

At 50 atm. pressure, the rocket's mass will be ≈373,000 tons,
(70,650×5=353,250; 353,250+26,217=379,467; 379,467≈(6,000-7,000)≈373,000 tons). That's 128 times the mass of the Saturn V rocket, (373,000:2,913≈128).

Now let us calculate the vacuum generation force over the carrier piston (2) (occurring when the air is pumped out above it), which facilitates the piston (2) upward movement inside the barrel (3) at the launch and the acceleration.

With a carrier piston (2) area equals 706 m$^2$, (7,060,000 cm$^2$) and a pressure differential (difference) of 0.9 bar (0.9 kg/cm$^2$) above and below the piston. The force facilitating the initial movement of the piston (2) with the rocket (1) upwards equals to
7,060,000×0.9=6,354,000 kg=6,354 tons; (this number corresponds to the weight of the piston (2)). The payload of the carrier piston (20) can be increased by this quantity for the whole period of the acceleration, since pumping out of the air and consequently creating moving vacuum above the piston continues during the period of piston acceleration.

We will not add this force to the possible mass of the rocket (1), we will leave it (keep it) for a reserve possibilities (elimination of struggle for each extra kilogram of weight) and for the case when vacuum (air pumping out) will not be used.

Of course, measures will be taken to prevent collapsing inward and bulging out of the walls of the system elements and their unintended shift due to vacuum (secondary design tasks).

Let us calculate the mass of the payload of the rocket (1) by analogy and proportion as for the Saturn V rocket—the ratio of the rocket's starting mass to payload, 2,913:139=21:1; 90,000:21=4,286 tons—payload weight of the rocket (1) at 10 atmospheres pressure under the piston (2); 161,000:

21=7,666 tons—payload weight of the rocket (1) at 20 atmospheres pressure under the piston (2).

But in fact, at a high velocity of preliminary acceleration of the rocket (1) in the launch barrel (3), this ratio will be even lower (better) and can reach 6:1 (and even lower), that is, the payload (mass of payload) will be even higher, because the rocket (1), in the proposed method, will turn on its engines already being preliminarily strongly accelerated without fuel expenditure (weight of the acceleration stage or stages) for this acceleration in the barrel.

Then the real payload according to this scheme equals to, 90,000:6≈15,000 tons, at a gas pressure of 10 atm. under the piston (2), 161,000:6≈26,833 tons, at a gas pressure of 20 atm.

373,000:6≈62,166 tons, at a gas pressure of 50 atm.

This is 108, 193 and 447 times respectively greater than the mass of the Saturn V payload, (15,000:139=108; 26,833:139=193; 62,166:139=447).

With reliable and powerful compression of exhaust and gunpowder gases in the volume (6) under the carrier piston (2) by means of a booster piston (14) and pushing support (16) (see FIG. 2-5), increase in pressure of gases under pistons (2), (14), (16.2), reduction of weight (weight decrease) of the pistons and support by filling them with light lifting gas—helium, facilitation of piston and support initial movement by releasing the energy of the compressed spring and moving vacuum, increasing the acceleration due to the mortar detachment of the rocket at the end of acceleration, and possibly other factors, the lifting force and speed (more information on speed will be provided below) movement of the carrier piston (2) and, accordingly, the weight of the rocket (1) and its payload will increase many-fold.

For example, as it has been already mentioned, that increasing the pressure of gases under the carrier piston (2) to quite acceptable so atmospheres will increase the weight of the rocket (1) to 373,000 tons, the payload mass to 62,166 tons (sixty-two thousand one hundred and sixty six tons), which is 447 times more than the mass of the payload of the Saturn V rocket, which has the best ratio so far (21:1) in the class of heavy rockets for the exploration of space (the record of W. Brown holds on, it has not been beaten).

And this huge payload is achieved mainly due to the rational use for acceleration of the free (no-cost) exhaust gases and large-diameter pipe-barrel.

Of course, for such a huge lifting capacity and dynamics of the rocket acceleration it will be necessary to strengthen the cylinders of the stages, the rocket hull, etc., which is quite calculable and feasible for a specific design and will not affect significantly the above-mentioned parameters.

Calculation of Speed and Carrying Capacity

1. Calculation of Speed Capabilities for Launch Schemes FIG. 1-4, 9.

FIG. 1. The rate of advance of the carrier piston (2) with the rocket (object) (1) in the launch barrel (3) according to this scheme depends on the quantity and pressure of the accumulated and forming exhaust and gunpowder gases of reaction engines (5) and gunpowder charges (7), as well as on the thrust and emission velocity of engine jet streams (5).

As mentioned earlier, the exhaust and gunpowder gases in this scheme will disperse in the increasing volume behind (under) the carrier piston as it moves, which will reduce their effectiveness.

The acceleration intensity according to this scheme can only be increased by increasing the amount of gunpower gases generated under the carrier piston (2), without exceeding the pressure limit, which in principle is not difficult or expensive to do (there is a huge amount of gunpowder accumulated in the world and its measured application has long been established). At the same time, the relative share of using the free exhaust gases for acceleration will decrease and it will be relatively difficult to change the force of gases impact (influence) and, accordingly, the force and speed of the acceleration.

According to a typical simple (known) calculation, with a launch barrel length of ~2,200 m and acceleration (overload) of 6 G (acceptable for man), it is possible to accelerate a rocket (1) with a crew (without mortar detachment at the end of acceleration) to a speed of ~480 m/s at the moment of departure from the barrel during the acceleration time in the barrel (3) which equals to ~10 seconds. (two seconds per initial movement and the rise of the gas pressure) and without a crew to a speed of ~1,200 m/s with an acceleration (overload) of 20 G in the barrel ~4.2 km long, or to a speed of ~1,700 m/s with a mortar detachment of the rocket (1) at the end of the acceleration (500 m/s—speed of a possible mortar launch, a total of 1,200+500×1,700 m/s).

At the previously specified acceleration speed of the carrier piston (2) up to 480 m/s, it will take approximately 300 m of braking distance for the carrier piston (2) to stop completely in the barrel (3) with a brake overload of ~80 G (80 G-294 m−1 s). With such a short braking distance and straight flight of the rocket (1) inside the vertical launch barrel (3)(after the rocket has been detached from the carrier piston) at this length, without risk of contact of the rocket (1) with the walls of the barrel (3), there is no need for a protective cocoon (41)(see FIG. 9) around the rocket (1) and in the departure of the above-mentioned piston from the above-mentioned (said) barrel.

Then the total length of the launch barrel (3) equals to the sum of the acceleration and braking lengths of 2,200+300=2,500 m (two thousand five hundred meters).

When reaching the "weightlessness" mode of the carrier piston with the rocket, it will be possible to achieve even higher acceleration speed at correspondingly higher overload (up to 60 G—quite acceptable for the rocket and engines electronics) and higher barrel length—up to 4-5 km/s—the velocity of the jet streams emission of the first acceleration stage of the conventional rockets.

FIG. 2-4. The use of a booster piston (14) and especially a pushing support (16) will make it easier to achieve even higher lifting capacity and acceleration parameters, added to increase the acceleration power and speed of the drive (21). There will be an effective compression of the exhaust gases under the carrier piston (2), which eliminates their dispersion along the length of the barrel and forms the "weightlessness" of the carrier piston, reducing the need for gunpowder gases, pushing support (16) allows to control the mode of acceleration easily.

For example (see FIGS. 3,4) with a smooth increase up to 10 r/s (up to 10 revolutions per second) of the leading drive wheel rotation (e.g. rack and pinion transmission) with a diameter of ~100 m of the drive (21) of the pushing support (16), the speed of the pushing support (16) movement and accordingly, of the booster piston (14) or the carrier piston (2) with the rocket (1) can reach 3,140 m/s (The length of the circumference "C" with the diameter ~100 m will be equal to C=π×D=3.14×100=314 m; that is during one revolution of the engine wheel, transmitting the movement to the support, the support will move (will be displaced in the direction of the wheel rotation) by 314 meters, during 10 r/c the support will pass 314×10=3,140 m., that is the speed of movement of the support (16) will be equal to 3,140 m/s.

It is quite possible that instead of the large diameter drive wheel given to simplify the calculation and facilitating the understanding, a more compact gearbox will be used to provide the above-mentioned or even higher speed of the support (16) movement and respectively that of the pistons and the object-rocket (1).

Mortar detachment of the rocket (1) from the carrier piston (2) in the end of the acceleration in the barrel (3) will further increase the rocket's (1) departure speed, which then will be 3,140+500=3,640 m/s. (three thousand six hundred and forty meters per second).

Also at such high acceleration speeds, the length of the braking path inside the launch barrel (3) for braking and stopping, of the carrier piston (2) for example, will be increased, and the departure of the carrier piston (2) out of the barrel (3) will be advisable, or in case of its non-departure (after braking), it will be advisable to include a protective cocoon (41). (see FIG. 9) around the rocket (1) to avoid its contact with the walls of the barrel (3) after its mortar departure from the braking carrier piston (2) in the extended (long) free flight of the rocket (1) in the cocoon (41) in the barrel (3) for the departure from the barrel.

Whereby, departure of the rocket (1) from a protective cocoon (41) in the form of mortar launch will once again increase the force and the speed of flight of the rocket (1), which will already be equal to the sum of speeds of acceleration of the rocket (1) in a barrel (3)—3,140 m/s (reached until its mortar detachment from the carrier piston), the speed of mortar detachment of the rocket (1) from the carrier piston (2)—500 m/s (first mortar detachment) and the speed of mortar detachment of departure of the rocket (1) from the protective cocoon (41) (second mortar detachment)—500 n/c, in total: 3,140+500+500=4,140 m/s (four thousand one hundred and forty meters per second).

2. FIG. 5. Calculation of the increase in the velocity of the rocket's (1) departure from the launch barrel (3) due to the simultaneous coordinated acceleration and the barrel (3) itself in the direction of acceleration of the rocket (1) during the period of its acceleration in the barrel (3).

If the rocket (1) accelerates in the launch barrel (3) of the length of ~2,500 m (2,200 m—acceleration, 300 m—braking of the carrier piston, see calculation for FIG. 1.) at the overload of 6 G to the speed of 480 m/s, and the barrel (3) with the aid of its various drives accelerates to the speed of 1.570 m/s by the time of detachment and departure of the rocket (1) (this is only 5 revolutions per second of drive wheels (21.1) diameter 100 m; C=π×D=3.14×100=314; 314×5=1,570 m/sec), then rocket's (1) departure speed from the barrel (3) (without mortar detachment) will be equal to the sum: 480+1,570=2,050 m/s, (~2 km/s)

3. FIG. 6 Calculation of the possibility (parameters) of acceleration of the rocket (1) only by means of a telescopic barrel (3.1-3.3) (without acceleration of the rocket inside the barrel), opening with acceleration of the inner section (3.3) of the barrel (due to the polyspast connection of the sections) resulting from the action of the pushing-out force of water, of the bottom reaction engines (5.5) of the outer section (3.1) and with the final mortar detachment of the rocket (1) from the upper part of the inner section (3.3) of the telescopic launch barrel.

Let us calculate the pushing-out force acting on the outer section (3.1) of the barrel submerged in water (sea abyss) (31).

According to the law of Archimedes the pushing-out force (Archimedes or hydrostatic lifting force) equals to the weight of the liquid displaced by the barrel. Let us assume that the section (3.1) has the diameter D=40 m and it is submerged in water (sea) (31) at a depth of H=1,000 m. The volume of displaced water will be equal to the volume of the cylinder V of the section (3.1) submerged in water, V–(π×R$^2$)×H=(3.14×20$^2$)×1000=1,256,000 m$^3$, where R=20 m—the cylinder radius. If we assume that 1 m$^3$ of sea water weighs 1 ton, then the pushing-out force of water will be equal to 1,256,000 tons (one million two hundred fifty-six thousand tons).

Such a 3-section barrel made of reinforced or cellular titanium (specific weight of titanium is 4,500 kg/m, titanium alloys are about 4 times stronger than aircraft aluminum alloys, but only 1.7 times heavier, it has good resistance to corrosion and heat resistance) will weigh about 30,000 tons. Let us add to this the weight of elements of polyspast system and elements of mortar detachment ~4,500 tons and we will get the sum of total weight of such barrel 30,000+4,000≈34,000 tons. Let us call it a parasitic mass. The pushing-out force of water can move up 37 such barrels (1,256,000:34,000≈37).

Let us subtract this parasitic mass from the pushing-out force of water and we will obtain the possible mass of the rocket at the beginning of the section (3.1) movement, 1,256,000–34,000=1,222,000 tons (one million two hundred and twenty-two thousand tons).

Since, during the upward movement—pushing out of the outer section (3.1) out of water, the pushing-out force will decline and at a depth of 500 m (full opening of the barrel sections upwards, see the scale picture FIG. 6) it will be half of the depth of 1,000 m, i.e. 1,256,000:2×628,000 tons (six hundred and twenty eight thousand tons).

It is from this real pushing-out force (at the moment of the final opening of the barrel sections) the parasitic mass should be subtracted in order to obtain the value of the rocket mass, which "seems" to be equal to: 628,000–34,000×594,000 tons (live hundred and ninety-four thousand tons).

However, since we have an accelerated advancement by 2 times of each inner section of the barrel relative to the nearest outer section, in accordance with the law of energy conservation. P=m×V$^2$/2=const, (where P is the pushing-out force, m—the lifted mass of the rocket, V is the velocity of the mass ascent) as ascent (the extending of the inner section) speed increases (rises) the force during its extension decreases, i.e. the lifted mass of the rocket decreases.

As previously stated (for our example of a single polyspast connection of the 3 section telescopic launch barrel) at the speed of ascent of the outer section (3.1) with the speed of 100 m/s, the middle section (3.2) is extended at the speed of 200 m/s, and the inner section (3.3) (where the rocket (1) is located) with the speed of 400 m/s, i.e., 4 times as fast as the outer leading section (3.1).

This means that the lifting force of the inner section (3.3) intended to lift the rocket (1) (we have taken into account and subtracted the parasitic mass earlier) will be reduced by 16 times (second power of the speed increase 4$^2$×16) in accordance with the law of energy conservation:
$m_1 \times V_1^2 = m_2 \times V_2^2/2$; $m_1 \times 100^2/2 = m^2 \times 400^2/2$; $m_2 = m_1/16$,
where $m_1$ is the mass before the speed increase, $m_2$ is the mass after the speed increase, $V_1$ is the primary speed (100 m/s), $V^2$ is the increased speed (400 m/s).

Then the possible lifted mass of the rocket (1) (due to the action of only the pushing-out force of water at a polyspast speed increase) will be equal:

594,000:16=37,125 tons (thirty-seven thousand one hundred and twenty-five tons). Let us add to this mass the unaccounted force (thrust) of the reaction engines (5.5) of the outer section (3.1).

As mentioned earlier, 1 m² of the area with a jet design (device) provides 37.1 tons of thrust, that is, lifts such a mass.

For the section base area (3.1) (with reaction engines) of 40 m diameter (radius R=20 m) the thrust will be equal to:

37.1×(π×R²)=37.1×(3.14×20²)=46,598 tons (forty-six thousand five hundred and ninety-eight tons), (we have taken into account the parasitic weight of the jet device earlier).

Then the true ascending mass of the rocket (1) due to the action of the pushing-out force of water and jet thrust for the open (extended) telescopic barrel will be equal to 37,125+46,598×83,723 tons (eighty-three thousand seven hundred and twenty-three tons).

That is 29 times higher than the launch weight of the Saturn V rocket (83,723:2,913=29). With a ratio of a rocket mass to a payload weight of 6:1 (as explained earlier), the proposed scheme will have a payload of 13,954 tons (thirteen thousand nine hundred and fifty-four tons), (83,723:6=13,954), which is 100 times the payload of Saturn V (13,954:139=100).

The remaining in the water 500 m. length of the external section (3.1) of the barrel (after its opening) and the corresponding pushing-out force of water (acting on this part of the barrel) are sufficient to keep the above-water part of the barrel in an upright position, all the more so with the use of a floating platform for vertical stabilization of the barrel, tension cables etc., which is not shown in this scheme (FIG. 6).

So, this simple launch scheme (FIG. 6) will make it possible to accelerate a rocket (1) weighing 83,723 tons (with a payload of 13,954 tons) to a speed of 400 m/s (without mortar detachment) or to a speed of 900 m/s with mortar detachment (the speed capabilities of this scheme were also explained earlier when describing the works for FIGS. 6*b*, 6*c*).

In case of single (not telescopic) barrel (it is only a section (3.1) with diameter of 40 m, accelerated by the pushing-out force of water and its reaction engines) in this scheme, it is possible to accelerate a rocket (1) weighing 640,598 tons (six hundred forty thousand five hundred and ninety-eight tons), (594,000+46,598=640,598), up to the speed of 100 m/s (without mortar detachment) or up to the speed of 600 m/s with mortar detachment from the barrel at the end of its ascent and acceleration, where 594,000 tons is the pushing-out force of water acting on the outer section (3.1) barrel at the beginning of acceleration (we will not decrease it during the ascent for simplicity as the decrease is compensated by the increasing inertia of the acceleration movement); 46,598—jet thrust (force) of engines (5.5) of the section base (3.1), 100 m/s—acceleration speed of the section (3.1) (see the earlier calculation).

For comparison: the mass of our rocket is 640,598 tons, which is 220 times more than the mass of Saturn V rocket, (640,598:2,913=220 times), and the payload of our rocket (with a possible 6:1 ratio) will be 768 times the payload of Saturn V rocket: (640,598:6=106,770; 106,770:139=768 times).

If the barrel's (3.1) diameter is increased to 46 m, the payload of the proposed launch will be 1000 times that of the Saturn V.

Free (for the period of direct acceleration) huge pushing-out force of water in this variant is dominant (prevailing) and exceeds the jet force by 13 times.

(594,000:46,598≈13 times) (for a barrel with the diameter of 40 m).

In order to use the excess of the huge pushing-out force of water more efficiently in order to increase the acceleration rate, the polyspast increase of acceleration speed was proposed with the use of 3 section telescopic barrel in accordance with FIG. 6 and further FIG. 7.

In fact, the payload capacity of the proposed launch under this scheme will be even higher, as part of the system located in the water (moreover sea water) will be lighter, and the cellular gas-filled structure of the walls of the barrel will not only be stronger, but also floating and non-sinkable (in case of depressurization or damage to the wall).

4. FIG. 7 Calculation of the parameters of acceleration of the rocket (1) with the help of the accelerating and opening telescopic barrel, as in the previous FIG. 6, but in which the inner section (3,3) simultaneously accelerating the rocket (1) and with additional acceleration of the sections of the barrel.

If (see FIG. 6) instead of fixed fastening of the cables (32) to the bases (34), the cables (32) (see FIG. 7) and additionally the cables (32.1) are wound with advance and force on the corresponding drive drums (35) and (21.3), the movement upwards of the external section (3.1) is enhanced by the engine (21.2), and the opening of the section (3.1-3.3) will also be enhanced by the jet thrust of the engines (5.6) and (5.7) of the piston bases (29.1) and (29.2), external reaction engines (5.10) and compressed gases by means of pistons (14.1) and (14.2), then the speed and force of extension (payload capacity) of the inner section (3.3) will further increase.

As a result, the thrust force (lifting capacity) of the inner section (3.3) (which is also the lifted mass of the rocket) will increase by at least 3 times, and the speed of its advancement will increase by at least 4 times.

Then the ascending mass of the rocket (1) will be equal to 83,723×3≈251,170 tons (two hundred and fifty-one thousand one hundred and seventy tons) (this is 86 masses of Saturn V), and the acceleration speed of the rocket (1) (only due to the acceleration of the inner section (3.3)) will be equal to 400×4=1,600 m/sec.

The speed of acceleration will be actually much higher. For example, if the outer section (3.1) accelerates to a speed of 940 m/s in ~7 seconds with a smooth increase in speed (this is only 5 revolutions per second of the drive wheels (21.2) with a diameter of D=60 m in the last seconds of acceleration).

C=π×D=3.14×60=188 m/sec at 1 r/sec; 188×5=940 m/sec at 5 r/sec), the inner section (3.3) with the rocket (1) (due to the polyspast speed increase) will have a speed of 940×4=3,760 m/sec.

At the same time, in the same 7 seconds, the rocket (1) in the inner section (3.3) with a length of 1,200 m (according to the principle for FIGS. 1,2) accelerates to a speed of ~360 m/s with an overload of 6 G.

Mortar detachment of the rocket (1) at the end of the acceleration in the barrel provides another ~500 m/s. In total: the total speed of the rocket's (1) departure due to the action of all forces will be equal to 3,760+360+500=4,620 m/s (four thousand six hundred twenty m/s).

At quite possible higher acceleration speed (in a longer barrel, with higher overload, and with faster rotation of the drives), the velocity of the acceleration and departure of the rocket (1) will exceed the first cosmic velocity (orbital velocity) and will be more than 7.9 km/s, which is quite calculable and feasible.

As mentioned earlier, increasing the pressure under the carrier piston (2) to a definitely feasible 50 atmospheres will increase the mass of the rocket to 373,000 tons with a payload of 62,166 tons (with a barrel diameter of 30 m). With a larger feasible barrel diameter, the launch capacity will be even greater.

So, we have received the final parameters of the rocket (1) acceleration according to this scheme, and this is not the limit of possible.

Actually, the speed and lifting capacity of this and other schemes will be even higher, if we take into account the initial amplifying the initial movement push resulting from the release of the compressed springs, the push from the activation of increasing additional energy (from the booster piston under the carrier piston), facilitating the acceleration of the masses by filling them with the lifting gas—helium.

Excluding the booster pistons (14), (14.1), (14.2) will reduce the gas compression under the carrier piston (2) and under the piston bases of the inner sections (3.2), (3.3), which will slightly reduce the power and speed parameters of acceleration, but will simplify the scheme.

All the above equipment, etc. for launch under this scheme can be placed on a floating offshore platform of the appropriate water displacement.

FIG. 8. Calculation of the rocket (1) acceleration in a curved (curvilinear) launch barrel (3) using for acceleration the Earth's gravity force, efforts and speed of advancement of the pushing (booster piston) support (16.3), unwinding and incoming (moving) into the barrel from the drive drum (38), the jet thrust of the carrier (2) and booster (14) pistons, compressed and forming gases and mortar detachment of the rocket (1) launch at the end of acceleration in the barrel (3).

In ~10 seconds of a free-fall only (without boosting) in the barrel (downwards ~550 m) the carrier piston (2) with the rocket (1) will accelerate to ~100 m/s (without energy consumption for the acceleration).

With the amplification of the piston (2) fall by means of thrust of the reaction engines (5) of the carrier piston (2) only, during these 500-600 m of falling down, the speed will increase to ~240 m/s during the acceleration of ~4 s with an overload of 6 G.

If the drive drum (38) (diameter D=100 m) of the support (16.3) spins up to 5 r/s (up to five revolutions per second) during this time of falling, we will get from this influence (through the compressed gases cushion in the volume (6)) the piston (2) advancement speed with the rocket (1) equals ~1,570 m/s at 5 r/s,
(C=2×π×R=π×D=3.14×100=314 m/s, at 1 r/s; 314×5=1,570 m/s, at 5 r/s).

At the same time, the energy consumption for such acceleration will be lower as it will not be necessary to overcome the Earth's gravity, which on the contrary will be useful for acceleration and the accumulated energy and the saved power will be used for subsequent acceleration upwards.

The vertical dimensions of the accelerating system will also be reduced.

Further, after passing the section of the barrel (3) with a downward inclination, the drive drum (38) is revolving at up to ~10 r/s, which will result in a speed of 3,140 m/s (three thousand one hundred and forty meters per second) the movement of the booster piston (14) transferring this speed and force to the "weightless" carrier piston (2) with a rocket (1)(the lifting force of compressed gases under the piston of increased diameter makes it "weightless", as explained earlier), which, due to this, will have a negligible inertial mass (for acceleration) and therefore it will receive much more easily and efficiently the speed impulse of its reaction engines (5).

And finally, the velocity of the rocket's (1) departure from the barrel (3) will increase by another ~500 m/sec from the mortar launch of the rocket's (1) detachment from the carrier piston (2).

The total speed of the rocket's (1) departure from the barrel (3) under this scheme will be 3,140+500=3,640 m/s (three thousand six hundred and forty meters per second).

The force and lifting capacity in this scheme at a barrel diameter of 30 m and a gas pressure of 10 atmospheres under the carrier piston will be 90,000 tons (this is the mass of the rocket (1)), or 373,000 tons (three hundred and seventy-three thousand tons) at a pressure of 50 atmospheres (as for the schemes according to FIG. 1-2).

At concrete design process, testing of the scaled down models of launch system, the parameters are specified and even if they will be 2 times lower than in the presented calculation, they still will be huge and the presented calculation substantiates such possibility.

Expanded Scope of Application for the Proposed Launch

The proposed system and method of launch, due to the huge lifting capacity hundreds of times greater than that of Saturn V, can be used for:

Delivery of giant blocks to Earth's orbits to assemble a starship and implement the idea of the "100 Year Starship" project of the symposium of scientists supported by the Pentagon and NASA.

Delivery and construction in the Earth's orbit of an incubator for the "production" of people, animals and plant products which will be adapted for a century long flight to new worlds. Ordinary earthlings won't be able to withstand a hundred years' flight. This will require singular posthumans with an additional artificially enhanced intellect—a new layer in appropriate brain with adapted, long-living body—Elon Musk—"Intelligence Amplified" symposium of scientists supported by the Pentagon and NASA.

Delivery and installation in the orbit of the Earth of giant blocks of the lifting system, which in turn will continuously send and return from the orbit cargo (smaller mass, but in large quantities) and crews, working shifts, from space factories and facilities. The proposed project will allow to revive and implement the Space Elevator (Lifting) project.

Delivery and dispersal in the upper appropriate layers of the Earth's atmosphere of components for the "repair" of the atmosphere in the required huge amounts.

Delivery to the orbit of the Earth and other planets (with good raw materials) of huge "space factories" for the extraction and production of the extractable resources. The implementation of many technologies and the production of materials in space is more efficient and of better quality, for example, space casting and growing allows to produce large homogeneous crystals, pure metals, foam metals.

Delivery of huge screens, nets, antennas, lenses, telescopes, power generation and transmission devices into space and into the orbit of the Earth (there are many projects on these topics, but there have been no means of delivery, now there will be).

Delivery to space and testing, away from Earth, of dangerous and unpredictable technologies, such as the annihilation (disappearance) of matter and substance, launching plants to produce monopoles and identifying the effects of their interaction and action (1000 times more energy than a nuclear reaction).

To counteract or destroy dangerous for the Earth asteroid or meteorite away from the Earth or the planet being developed.

According to the BGS (British Geological Survey) and the UN assessments, the Earth's still available sources of raw materials are rapidly disappearing, and consumption is increasing. In short, a disaster of raw material shortages on Earth for development and consumption is approaching.

The huge mass of useful cargo (load) and low unit cost (price) of its launch according to the proposed method will allow the simplest, cheapest and most productive method with less time consumption to master and create reserves, process and transport various raw materials, materials (platinoids, rare earth metals, uranium, etc.) on the Moon, Mars, asteroids and their delivery to the Earth or other planets. This will create the soil and atmosphere on suitable for life planets and transport life to them in a much shorter time.

The proposal by NASA and others to build small domes and bases for living and exploration of Mars takes too long and is expensive, although it may be acceptable for a small start of the exploration.

Proposed launch of a huge lifting load, cheap and reliable will help to actually revive the process of developing space resources.

Restoration (creation) of the magnetic field MHD and the atmosphere of Mars (or other suitable for life planets), changing the inclination of the axis and the speed of rotation of the planet, for example, to turn to the Sun and thaw the ice caps of Mars for creation of the seas and oceans before settling and beginning of fishing in 100-200 years (forecast). Of course (it is clear that) technogenic impact on the dynamics of rotation and inclination of the planet's axis will cause a shift of masses of lithosphere, asthenosphere, heating, eruptions, earthquakes, form change (in the zone of new poles—flattening) and so on, which will only benefit the revival of planet's MHD and its further revival. It is also quite feasible to initiate multiple polarity reversal of the planets. Huge lifting capacity of the launches will allow to implement all the proposed ideas, on the known sodium pole model of the Earth it can even be checked).

Scientists from NASA are also trying to solve the problem of terraforming Mars—to create (restore) the magnetic field and atmosphere of Mars (it is believed that in the past there was an atmosphere on Mars similar to that of Earth, and there was a magnetic field similar in parameters). In 2018, they came up with the idea that if the magnetic field of Mars is still impossible to recreate, that is, a chance to someday in the distant future to imitate it—to place at the point of Lagrange (where the gravity of Mars is balanced by the gravitation of the Sun) a powerful magnetic dipole, which will create the necessary magnetic protection and only then it makes sense to conduct the reconstruction of the atmosphere, which will already keep the field from being demolished by the solar wind.

This invention will accelerate the solution to all this.

Huge lifting capacity of the proposed launch system will allow to create a non-limited (unlimited) by weight protection of larger volumes of objects launched into space from radiation, to create a suitable for life electromagnetic field and gravitation, including variable ones for various purposes of space exploration with humanoids.

To quickly and discreetly send, launch into space at once thousands of combat space platforms of kinetic, laser and particle beam weapons (see "Rods from God" initiative L. Laroushe, SDI, "High Frontier", "Heritage Foundation", project "BEAR (Beam Experiments Aboard Rocket)—USA and other projects).

To implement this launch requires a high lifting capacity carrier. The launch that I propose solves this problem.

A deep penetrating rod (for example, having much larger mass than the known ones) accelerated to huge speed. It can made with an expansive action (opening), braking and release of enormous kinetic energy (acceleration) at a given depth.

Options with multistage cumulation, with the action direct upwards or downwards or radially, etc. are possible, which will be much more effective than simple deep penetration. Even if the penetrating rod slightly overshoots the desired impact area (due to high speed and delayed activation), the undermining and the destruction of the area from below will be even more effective. (Aircraft runways will be blasted from below after piercing and penetration from above).

In addition to the above-mentioned, electrophysical methods of burning through, piercing, and penetration of materials in the process of penetration and braking of the rod will be used, which will significantly increase its effectiveness.

And then it will be possible to destroy and wipe out easily and conventionally in a large underground volume, without a direct hit (because the area-volume of the destruction wave will be huge) large nuclear, enrichment, missile (silos), factory and other facilities. The proposed means of launching a huge payload (with a preliminary launch into space of the platform for throwing rods or with direct launch through space of hundreds of rods from several basic carriers) will solve all problems. Such a good depth bomb directed to the "point" of stress concentration in the Earth's crust (these places are known) can even cause a devastating earthquake and eruptions in the area of interest.

There is also a project for a deep impact on the meanwhile slowly awakening Yellowstone volcano for its quick revival with known terrible consequences for the United States.

American station HAARP (Alaska) and Russian stations, for example, "Sura" (Nizhny Novgorod region) can emit electromagnetic (EM) waves into the ionosphere (into the highest layers of the Earth's atmosphere) to study ionospheric phenomena. Such stations can also be used for military purposes—to remove satellites and space objects from a given orbit and even change the trajectory of missile warheads, etc. Rapid deployment (mounting) of such stations in space will allow to increase by many times their effectiveness against space and ground objects and living organisms (for example, crowds of enemy soldiers or swarms of locusts, parameters of impact will be clarified), especially in the mode of phased resonance focusing on objects from several points of space. Modeling also shows that external (from space) influence on the ionosphere, the Earth and objects is much more effective. The huge lifting capacity of the proposed launch method will allow to implement all this quickly, easily and discreetly in case of need.

For rapid deployment in space on the path of movement of missiles and false targets, gigantic by their area (2,000 km×2,000 km) multi-row, maneuverable, exploding and electro-discharging (in the capture sector) intercepting nets from their original compact state in which they can "float" and move (search) in space in standby and locating mode. Such nets can reliably intercept a variety of maneuvering missiles and combat maneuvering units.

Huge volumetric nets, crossing the Earth's magnetic field at high speed, can generate huge electrical potential for a variety of purposes. A five-kilometer cube of electrically conductive nets in volume (crossing the field at an angle of 45°—the condition for producing the maximum electrical potential) will be able to provide the entire Earth with energy and charging space laser etc. with huge free energy.

Such huge controllable nets can also clear the near-Earth space from space debris of all sizes, quickly, reliably and cheaply thanks to the huge lifting capacity of the proposed launch. There are millions of small dangerous debris flying around the Earth, about 24,000 large objects, tens of thousands more nano-satellites, picosatellites, femtosatellites and other CubeSats will soon be added to them, and together with the debris there will be total chaos if clean-up is not initiated.

DARPA has also been apparently dealing with space debris (the Phoenix program) for many years with a robotic hand manipulator designed to actually capture other satellites.

Air defense and missile defense have become a single complex of detection and interception means, and there is only one way to deceive it—by maneuvering. For ballistic missiles this is also a possible method, but very energy consuming, as the existing missiles burn all their fuel immediately after the launch and maneuvering in the atmosphere and space is possible only by reducing the range.

The unlimited lifting capacity and high pre-acceleration of my proposed launch (a high speed will already increase the invulnerability of the rocket at the initial stage even without maneuvering) will allow me to easily make a ballistic missile maneuvering and even with active protection in flight without any tradeoff.

Moreover, it will be even more effective when launching tens or hundreds of missiles in a pack or packs one after another in a single launch (acceleration), which after departure from the launch barrel split into a swarm of maneuvering missiles with maneuvering further (after separation) even more swarms of warheads.

For the transfer of many hundreds of tanks and other military equipment from one area of the Earth to another in landing splitting packs with parachute-jet braking with the crew or robots.

For example, with a payload mass of only 20,000 tons, ~400 Abrams M1 tanks can be launched and sent through space to the area of application at once, with the ammunition set—landing splitting cassette packs—a cylinder with a diameter of 26 m and a height of 50 m. All this easily (suitable) fits into the launch barrel of the proposed launch system with a reinforced rocket carrier frame for the delivery.

For jet delivery and dropping on the enemy sites conventional super-bomb with a mass, for example, of 20,000 tons TNT (twenty thousand tons) (specific weight of 1,641 kg/m)—a cylinder with a diameter of 26 m. and a height of 40 m. will destroy a huge city in one blow.

It is quite possible to deliver a TNT bomb with a mass of 107,000 tons (one hundred seven thousand tons; 640,000:6≈107,000; 1:6 ratio mentioned earlier for the payload of the rocket).

For the transfer of tens of thousands of combat robots with equipment at once Boston Dynamics company with the support of DARPA is already developing combat robots of the future, to reduce the a lag a program DARPA AI Next ($2 billion) is launched, with participation of the company Booz Allen Hamilton (Artificial Intelligence for robots and drones, $885 million).

The huge lifting capacity of the proposed launch and, accordingly, the possibility of obtaining a giant controlled (in direction and quantity) energy on a large area and in a large volume of space will actually allow the destruction or invocation, from space, the formation of a giant whirlwind-tornado-hurricane, and then the free Coriolis's enormous natural power will strengthen its twist, which can be further enhanced by periodic supply of energy and then we get a super powerful whirlwind-tornado-hurricane of controlled power, area and direction in the required area.

The dynamics of the origin of such ground and oceanic energy flows are more or less studied. Proposals to create an artificial hurricane by heating the ocean surface from space with lasers are known for directing the masses of water to the areas of forest fires and of course to flood and destroy the enemy's territory. There is also a known proposal for the destruction of the hurricane at its initial stage by the energy impact. Developers of aircraft munitions proposed for this purpose, special remote-controlled air bombs that do not create shrapnel and specially formed energy flow during an explosion. There is also a known proposal to destroy a hurricane at its very source with a laser from space after its easy detection also from space, which is much more effective in the presence of a powerful energy source, which this invention enables launching into space.

Tsunami. The parameters of destruction of the U.S. coast by a super bomb creating tsunami were calculated long ago by the academician Andrei Sakharov. And then there is an autonomous torpedo with a 100 megaton nuclear warhead—"Status—6" (according to NATO classification Kanyon), which, among many other things, can create a tsunami wave 500 meters high.

Delivery of such torpedoes (or my conventional rocket—torpedo) through space with the help of the huge lifting capacity launch system that I propose will make their use instant, unexpected and will eliminate the need for submarines for their delivery.

It is also expedient to use the principles of reactive propulsion of the torpedo "Shkval" (described earlier, the speed of 100 m/sec) for the movement of such a torpedo under water, which will simplify the scheme, reduce dimensions, increase economy (since there will be no reactor power plant) and prevent the interception of the torpedo.

For dropping and dispersion (over a huge enemy territory) in one overflight of the base carrier of many thousands of known gliding bombs (adapted for dropping from space) with homing strike elements or many thousands of loitering munitions, or thousands of battle drones with millions of different miniature munitions, or many thousands of properly made E-bombs to disable all electronics and electrical networks throughout the enemy's country—everything will be paralyzed and de-energized, and in the winter will be frozen, radars will be destroyed, missiles and planes will not take off, and those which managed to take off will fall.

The selective sectoral impact (arising from the powerful impulse of E-bomb) from space on already flying missiles will cause them to become destabilized, the satellites will fail. The friendly missiles, satellites and space or ground facilities will be shielded from the effects by the Faraday cage during this period.

For the rapid transfer through space of a huge fleet of submarine and floating vessels for various purposes (such as thousands of missiles-torpedoes, amphibious vessels, mini robots with explosives, etc.) to the sea off the coast of the enemy to destroy military ports and bases and everything that is in them and subsequent easy capture of the coast.

To drop in one flight tens of thousands of tons of substances causing huge torrents of rain and hail over a huge area for flooding the enemy, extinguish fires in California and reviving the Sahara Desert.

By dropping special substances in huge quantities, according to the scheme, causing spiral movement of streams (the process is modulated and calculated) it is possible to cause a giant whirlwind tornado (in a combination with to the aforesaid).

There is a known proposal and even the implementation of missile systems (including the use of ballistic and cruise missiles) to extinguish fires that are difficult to access with water, foaming, powdery agents emitting carbon dioxide.

At a certain altitude, the missiles explode and drop the fire extinguishing agents on the tree tops or on the ground. They also use rockets that spray fire extinguishing agents. The main disadvantage of this proposal is its low payload.

Huge payload (mainly using free energy) of my proposed launch of a base carrier will increase hundredfold the effectiveness of fire fighting in case of its use for fighting the fires. A mobile floating vessel moving, for example, along the coast of often burning California will not even need a water component to extinguish a fire, as the water will be overboard, and other components in large quantities in the hold, you just have to load, shoot and end the fire.

It is also possible to quickly handle huge areas for fighting locust, rodent infestation, and quickly make impenetrable localization of anything along a huge closed perimeter.

In wartime, such means (of huge lifting capacity) can be used for effective, quick, sudden and cheap way to cover (treat) large areas (about 10,000 km$^2$-20,000 km$^2$ with napalm or tear gas. An excellent example for dual-use technologies.

It is quite feasible with the help of the proposed system to launch into space a similar (by a number for characteristics) slightly smaller system for launching already from space to a farther space the necessary "useful" load. By this method, it is possible to reach even higher acceleration speed (100-1000 km/s) of the object in general without energy expenditure to overcome the Earth's gravity.

Huge payload of the proposed launch will provide an opportunity to achieve all this, as well as allow to shield the launch and the subsequent acceleration and flight from all detection signatures and even establish active protection of the base flying object.

There is also a clear possibility of quick moving out of the lightweight telescopic columns from the sea from a floating vehicle (much smaller than for launching) to a height of 1-3 km. to create various antennas, networks, screens, beacons, high-altitude radar, laser, periscope.

The invention claimed is:

1. A system for acceleration of at least one object comprising:
   a launch barrel;
   at least one carrier element adapted of being accelerated with said object detachably installed on said carrier element; and
   at least one acceleration element adapted to enhance the acceleration of said carrier element along said launch barrel,
   wherein said acceleration element and said carrier element having a volume in between, and wherein said carrier element and said acceleration element are movable, and
   wherein said carrier element comprises at least one reaction engine which emits gases behind said carrier element towards the inside volume of said launch barrel, wherein, said accelerating element adapted to press gasses that accumulate behind said carrier element.

2. The system of claim 1 wherein said accelerating element comprises at least one reaction engine which emits gases behind said accelerating element towards the inside volume of said launch barrel.

3. The system of claim 1 comprising a plurality of concentric cylindrical sections, said plurality of sections comprises said launch barrel and said carrier element, wherein said carrier element having the shape of a cylinder, wherein said launch barrel selected from the group consisting of a cylinder, a middle inner section of a telescopic launch barrel, a middle section, section 3.2 of a telescopic launch barrel, and combination thereof, wherein said carrier element selected from the group consisting of a carrier piston, a launching cylinder, a mortar barrel, a support frame, an inner section of a telescopic barrel, an internal section of a telescopic barrel, and combinations thereof, and wherein said acceleration element selected from the group consisting of a booster piston, a pushing support, a piston base of a barrel, a movable barrel, an inner section of the telescopic launch barrel, an internal section, section 3.3, an inside section, and combination thereof.

4. The system of claim 3 wherein the movement of said sections is coordinated by at least one device selected from the group consisting of polyspast, a gear, and combinations thereof.

5. The system of claim 3 wherein at least one reaction engine is located inside at least one volume between at least two of said sections.

6. The system of claim 1 wherein said acceleration element is connected to a tubular member having a first and second end, wherein said first end is connected to said acceleration element, and wherein said second end is connected to a piston.

7. The system of claim 1 comprising at least one means having a controllable output and adapted to control movement of at least one system movable element, said movable element selected from the group consisting of said carrier element, said accelerating element, and said cylindrical section, wherein said means to control movement selected from the group consisting of a drive, a brake and combination thereof, said drive selected from the group consisting of a reaction engine, an electromechanical drive, a diesel engine, a biasing means, a system part utilizing buoyant force and combination thereof, said brake selected from the group consisting of a pressure release valve, a friction brake, and combinations thereof, wherein said control of movement comprises acceleration, brake the movement of said movable element, and prevention of collision of said movable element.

8. The system of claim 1 wherein said object is being shot from a mortar so as to detach from the carrier element.

9. The system of claim 1 comprising at least one gas emitting charge for increasing pressure in at least one part of the inside volume of said launch barrel.

10. The system of claim 1, wherein said carrier element having a cross sectional area considerably larger compared to said object maximal cross sectional area, and wherein said launch barrel having a cross sectional area considerably larger compared to said maximal cross sectional area of said object.

11. The system of claim 1 comprising a cocoon installed around said object.

12. A system for acceleration of at least one object comprising:
 a launch barrel;
 at least one carrier element adapted for being accelerated with said object detachably installed on said carrier element; and
 at least one pushing support adapted to enhance the acceleration of said carrier element along said launch barrel,
 wherein said pushing support and said carrier element having a volume in between, and wherein said carrier element and said pushing support are movable,
 wherein at least one part of said launch barrel is curved, and wherein at least one part of said pushing support is flexible, and wherein at least one part of said launch barrel descends thereby allowing utilizing of gravitational force to accelerate said object.

13. A method for accelerating of at least one object, said method comprising:
 accelerating at least one carrier element along a barrel, said carrier element detachably connected to said object;
 accelerating at least one acceleration element along a launch barrel; and
 controlling the movement of at least one of: said carrier element, and said accelerating element,
 wherein said acceleration element and said carrier element having a volume in between, and
 wherein said acceleration of said acceleration element enhances said accelerating of said carrier element by pressing gasses that accumulate behind said carrier element.

14. The method of claim 13 comprising activating at least one reaction engine which emits gases behind said carrier element towards the inside volume of said launch barrel.

15. The method of claim 13, wherein said controlling the movement is done by at least one means to control movement, said means selected from the group consisting of a drive, a brake and combination thereof, said drive selected from the group consisting of a reaction engine, an electromechanical drive, a diesel engine, a biasing means, a system part utilizing buoyant force and combination thereof, said brake selected from the group consisting of a pressure release valve, a friction brake, and combinations thereof, said controlling the movement comprises accelerating and braking the movement, and prevention of collision of said movable element.

16. The method of claim 13 comprising accelerating a plurality of concentric cylindrical sections, said plurality of sections comprises said carrier element, wherein said carrier element having the shape of a cylinder.

* * * * *

UNITED STATES PATENT AND TRADEMARK OFFICE
CERTIFICATE OF CORRECTION

PATENT NO. : 11,041,692 B1
APPLICATION NO. : 16/872460
DATED : June 22, 2021
INVENTOR(S) : Michael Chromych It is certified that error appears in the above-identified patent and that said Letters Patent is hereby corrected as shown below:

On the Title Page

Item (57), Abstract, please replace the abstract with the abstract provided below:
A system and method for acceleration of a flying object, preferably with large take-off mass is described. The system can accelerate an object with a mass of several hundred thousand tons. The system includes the use for object acceleration of free (for the period of direct acceleration) energy of exhaust gases of the system elements' reaction engines (for example: rocket engines), pushing-out force of water, force of Earth's gravity, initial movement energy of the compressed spring and vacuum, lifting force of light gases, as well as energy consuming, for the period of acceleration, action of the system elements' reaction engines, gunpowder gases and drives. The system and the method include acceleration of an object simultaneously in several systems accelerating one inside the other with the summation and increase of acceleration speed. The main elements of the system: launch barrel, carrier and booster pistons with reaction engines, and pushing the pistons support.

Signed and Sealed this
Thirteenth Day of June, 2023

Katherine Kelly Vidal
*Director of the United States Patent and Trademark Office*